(12) United States Patent
Matsushita

(10) Patent No.: US 7,974,352 B2
(45) Date of Patent: Jul. 5, 2011

(54) WIRELESS TRANSMITTER, WIRELESS RECEIVER AND WIRELESS COMMUNICATION SYSTEM

(75) Inventor: Yoshiteru Matsushita, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1043 days.

(21) Appl. No.: 11/794,195

(22) PCT Filed: Nov. 25, 2005

(86) PCT No.: PCT/JP2005/021694
§ 371 (c)(1),
(2), (4) Date: Jun. 26, 2007

(87) PCT Pub. No.: WO2006/070551
PCT Pub. Date: Jul. 6, 2006

(65) Prior Publication Data
US 2008/0043880 A1 Feb. 21, 2008

(30) Foreign Application Priority Data
Dec. 28, 2004 (JP) ................................ 2004-378485

(51) Int. Cl.
*H04L 27/28* (2006.01)
(52) U.S. Cl. ................. 375/260; 375/219; 375/295
(58) Field of Classification Search .................. 375/260, 375/267, 295, 346, 219
See application file for complete search history.

(56) References Cited

U.S. PATENT DOCUMENTS

| | | | | |
|---|---|---|---|---|
| 6,721,569 | B1 * | 4/2004 | Hashem et al. ............... | 455/450 |
| 7,376,193 | B2 * | 5/2008 | Lee et al. ..................... | 375/260 |
| 7,660,367 | B2 * | 2/2010 | Nishio et al. ................. | 375/329 |
| 7,688,766 | B2 * | 3/2010 | Maltsev et al. ............... | 370/310 |
| 2002/0176364 | A1 | 11/2002 | Nakamura et al. | |
| 2005/0163067 | A1 | 7/2005 | Okamoto et al. | |
| 2007/0147251 | A1 * | 6/2007 | Monsen ........................ | 370/235 |

FOREIGN PATENT DOCUMENTS

| | | | |
|---|---|---|---|
| JP | 2001-103034 A | | 4/2001 |
| JP | 2002-353878 A | | 12/2002 |
| JP | 2003-304214 A | | 10/2003 |
| JP | 2004-208234 A | | 7/2004 |
| WO | WO 2004091126 A1 * | | 10/2004 |

OTHER PUBLICATIONS

Tomoaki Yoshiki et al., IEICE Technical Report, RCS2002-240, vol. 102, No. 550, Jan. 9, 2003, pp. 65 to 70.
Takashi Baba et al., IEICE Technical Report, RCS2003-279, vol. 102, No. 550, Jan. 9, 2007, pp. 11 to 16.
Toshiyuki Nakanishi et al., IEICE Technical Report, RCS2002-279, vol. 102, No. 550, Jan. 9, 2004, pp. 59 to 64.

* cited by examiner

*Primary Examiner* — David B Lugo
(74) *Attorney, Agent, or Firm* — Birch, Stewart, Kolasch & Birch, LLP

(57) ABSTRACT

To reduce interference mutually provided among peripheral cells, and perform data transmission while maintaining total throughput at the maximum level.
Provided are an acquiring section (105) that acquires information of interfering power level that a communication apparatus receives from peripheral cells from a signal received from the communication apparatus, a determining section (106) that determines the number of subcarriers to use in data transmission corresponding to the information of interfering power level, and a modulation scheme determining section (107) that determines a modulation scheme for each of the subcarriers to use in data transmission corresponding to the information of interfering power level, and a radio signal is transmitted to the communication apparatus using the modulation scheme determined in the modulation scheme determining section (107) and the number of subcarriers determined in the determining section (106).

7 Claims, 24 Drawing Sheets

WIRELESS TRANSMITTER, WIRELESS RECEIVER AND WIRELESS COMMUNICATION SYSTEM

TECHNICAL FIELD

The present invention relates to a wireless transmitter, wireless receiver and wireless communication system for performing multicarrier communication, and more particularly, to a wireless transmitter, wireless receiver and wireless communication system for performing wireless communication according to an OFDM system to which MTPC is applied.

BACKGROUND ART

Conventionally, wireless communication systems have been known that adopt an Orthogonal Frequency Division Multiplexing (hereinafter, referred to as "OFDM") transmission scheme. OFDM is one of multicarrier modulation schemes, and features large tolerance to multipath fading occurring when the propagation path is complicated by obstacles, as compared with the conventional single-carrier modulation scheme.

In recent years, a one-cell reuse OFDM system has been proposed which is aimed to apply high-speed technique by OFDM to mobile terminals such as cellular telephones and the like. In such a one-cell reuse OFDM system, a Multilevel Transmit Power Control (hereinafter, referred to as "MTPC") scheme is known as a technique for providing tolerance to interference with other cells. This MTPC scheme is to use an adaptive modulation scheme for transmitting a subcarrier causing large attenuation of the reception power by multipath fading using a modulation scheme with a low modulation level, while transmitting a subcarrier causing small attenuation of the reception power using a modulation scheme with a high modulation level, and adjust the transmit power of a subcarrier for transmitting data so as to obtain a desired SNR, and has received attention as measures against multipath fading from the viewpoints of limitations in maximum value of the transmit power and the like, and efficient use of subcarriers.

Described herein are differences in transmission spectrum between the typical OFDM system and the OFDM system applying MTPC. FIG. 15 contains graphs to explain the differences in transmission spectrum between the typical OFDM system and the OFDM system applying MTPC. FIG. 15(a) shows a transmission spectrum in the typical OFDM system, and FIG. 15(b) shows a transmission spectrum in the OFDM system applying MTPC. In FIGS. 15(a) and 15(b), the vertical axis represents the transmit power, and the horizontal axis represents a subcarrier number.

It is assumed in FIG. 15 that the number of subcarriers is twelve, and that the subcarrier number is assigned sequentially from the left. It is further assumed that FIG. 15 (b) shows a case of using four modulation schemes, 64QAM (Quadrature Amplitude Modulation), 16QAM, QPSK (Quadrature Phase Shift Keying) and BPSK (Binary Phase Shift Keying), and shading is provided according to the modulation scheme. Dots are provided in the case that the modulation scheme is 64QAM, oblique lines are provided in the case of 16QAM, horizontal lines are provided in the case of QPSK, and shading is not provided in the case of BPSK. Such fading is the same as in explanatory drawings of the transmission spectrum in this specification as described below.

As shown in FIG. 15 (a), in the typical OFDM scheme, modulation is performed using the same modulation scheme in all the subcarriers, and data is transmitted with equal transmit power in all the subcarriers. In contrast thereto, in the OFDM system applying MTPC, as shown in FIG. 15(b), modulation is performed using a modulation scheme with a different modulation level for each subcarrier corresponding to the propagation path state, and the transmit power is controlled for each subcarrier. More specifically, (1) a subcarrier with a good propagation path state is modulated using a modulation scheme with a high modulation level, while a subcarrier with a poor propagation path state is modulated using a modulation scheme with a low modulation level;

(2) the transmit power of each subcarrier is adjusted corresponding to quality of the transmission path so as to obtain a desired reception SNR on the receiving side for each subcarrier; and (3) a subcarrier with extremely low quality of the propagation path is not provided with the transmit power, and set as a carrier hole.

FIG. 15(b) shows the case where subcarrier number 1 is set for 64QAM as a modulation scheme, subcarrier numbers 2 and 3 are set for 16QAM, subcarrier numbers 4 to 6, 11 and 12 are set for QPSK, subcarrier numbers 7, 8 and 10 are set for BPSK, and subcarrier number 9 is set for a carrier hole.

FIG. 16 is a diagram showing a configuration example of a wireless communication system for performing communication using such an OFDM system applying MTPC. The wireless communication system as shown in FIG. 16 is assumed to be comprised of a one-cell reuse cellular system where the same carrier frequencies are used in all cells.

As shown in FIG. 16, a base station apparatus 20 is installed in each cell 10, and performs bidirectional communication with a mobile station apparatus (hereinafter, referred to as a "terminal" as appropriate) 30. It is assumed in FIG. 16 that the OFDM system applying MTPC is used in transmission (downlink) from the base station apparatus 20 to mobile station apparatus 30. A communication scheme of transmission (uplink) from the mobile station apparatus 30 to base station apparatus 20 and the frame format are not particularly limited, and it is possible to use known communication schemes and frame formats.

The mobile station apparatus 30 receives a downlink signal transmitted from the base station apparatus 20, analyzes the signal, and estimates an interfering power level received from peripheral cells. Then, the apparatus 30 notifies the base station apparatus 20 of the estimated interfering power level. Based on the interfering power level notified from the mobile station apparatus 30, the base station apparatus 20 sets a modulation scheme, transmit power and carrier hole for each subcarrier.

In the wireless communication system as shown in FIG. 16, FIG. 17 is a diagram showing structures of frames transmitting to mobile station apparatuses 30 in cells 10 from base station apparatuses 20, respectively. FIG. 17 shows structures of frames transmitted to terminals A, B and C among the mobile station apparatuses as shown in FIG. 16.

As shown in FIG. 17, it is assumed that transmission timing of an OFDM symbol to each terminal from the base station apparatus 20 is synchronized among the calls. Shown herein is the case where at time t1 is started transmission of a first OFDM symbol to the terminal A, at time t2 is started transmission of a second OFDM symbol to the terminal A, and transmission of a first OFDM symbol to the terminal B, and at time t3 is started transmission of a third OFDM symbol to the terminal A, transmission of a second OFDM symbol to the terminal B, and transmission of a first OFDM symbol to the terminal C.

Further, as shown in FIG. 17, it is assumed that timing (hereinafter, referred to as "control update timing") for updating control of the modulation scheme and transmit power is set to be different timing between adjacent cells. When the control update timing of the modulation scheme and the like is the same as that in an adjacent cell, actual interfering power cannot be reflected in control, and this is because of avoiding an event that the control becomes unstable. The case is described herein where time t4 is set as the control update timing for the terminal A, time t5 and time6 are respectively set as the control update timings for the terminals B and C, and time t7 is set as the second control update timing for the terminal A.

Described herein is a method of determining a modulation scheme and the like of each subcarrier in each base station apparatus 20. FIG. 18 contains graphs to explain the method of determining a modulation scheme and the like of each subcarrier in each base station apparatus 20. It is assumed that FIG. 18 shows the case of using four modulation schemes, 64QAM, 16QAM, QPSK and BPSK.

FIG. 18(a) shows the interfering power level estimated by the mobile station apparatus 30 in the cell 10, and FIG. 18(b) shows the transmission spectrum from the base station apparatus 20 to the mobile station apparatus 30 determined corresponding to the interfering power level estimated by the mobile station apparatus 30. In addition, in FIG. 18(a), the vertical axis represents the interfering power, and the horizontal axis represents the subcarrier number. Meanwhile, in FIG. 18(b), the vertical axis represents the transmit power, and the horizontal axis represents the subcarrier number.

The dashed lines as shown in FIG. 18(a) show maximum allowance interfering power levels to select 64QAM, 16QAM, QPSK and BPSK as a modulation scheme respectively from the below. In other words, 64QAM is selected as a modulation scheme for a subcarrier with the interfering power being the maximum allowable interfering power level for 64QAM or less, and among remaining subcarriers, 16QAM is selected as a modulation scheme for a subcarrier with the interfering power being the maximum allowable interfering power level for 16QAM or less. Similarly, among remaining subcarriers, QPSK is selected as a modulation scheme for a subcarrier with the interfering power being the maximum allowable interfering power level for QPSK or less, and further, among remaining subcarriers, BPSK is selected as a modulation scheme for a subcarrier with the interfering power being the maximum allowable interfering power level for BPSK or less. In addition, a subcarrier with the interfering power level more than the maximum allowable interfering power level for BPSK is set as a carrier hole. FIG. 18(b) shows modulation schemes selected corresponding to the interfering power levels as shown in FIG. 18(a). In addition, types of shading according to the modulation schemes as shown in FIG. 18(b) are the same as in FIG. 15(b). Thus, the base station apparatus 20 determines the modulation scheme and the like at the communication start timing in each mobile station apparatus 30, while updating the modulation scheme and the like at the control update timing, and is thereby capable of selecting a suitable modulation scheme and the like corresponding to the interfering power level estimated by each mobile station apparatus 30 to communicate.

Non-patent Document 1: Toshiyuki NAKANISHI, Seiichi SAMPEI, Norihiko MORINAGA, "Study on interference reduction technique in a one-cell reuse OFDM/TDMA system using a subcarrier adaptive modulation scheme", IEICE Technical Report RCS2002-239, pages 59-64, 2002

Disclosure of the Invention

However, when each base station apparatus 20 determines the modulation scheme and the like using the above-mentioned determination method, mobile station apparatuses 30 in cells 10 interferer with one another in an area where the cells 10 exist densely, and an event arises that data transmission can only be executed with modulation schemes with relatively low modulation levels. As a result, such a problem occurs that total throughput reduces in the wireless communication system.

Referring to FIGS. 19 to 24, described below is the relationship between the interfering power and transmission spectrum when the modulation scheme and the like are determined using the above-mentioned determination method and each base station apparatus 20 transmits data to the terminal A, terminal B or terminal C as shown in FIG. 16 according to the frame structure as shown in FIG. 17. Each of FIGS. 19 to 24 shows the relationship between the interfering power in each terminal at time t0 to t5 as shown in FIG. 17 and the transmission spectrum to each terminal. In each of FIGS. 19 to 24, (a), (b) and (c) show the relationship between the interfering power estimated by the terminal A, B or C and the transmission spectrum corresponding to the interfering power, respectively.

At time t0, as shown in FIG. 19, since any terminals do not start communication, any base station apparatuses 20 do not provide transmit power. Therefore, the transmission spectrum does not appear to any terminals.

At time t1, as shown in FIG. 20, the terminal A starts communication. With the start of communication in the terminal A, the base station apparatus 20 determines modulation schemes and the like corresponding to the interfering power notified from the terminal A, and starts data transmission. At this point, the base station apparatus 20 determines the modulation scheme according to the procedures as explained in FIG. 18. Therefore, as shown in FIG. 20(a), as the modulation scheme, 64QAM is selected in subcarrier numbers 1 to 3, while 16QAM is selected in subcarrier numbers 4 to 12. In addition, with the start of communication in the terminal A, the interfering power levels estimated by the terminals B and C increase as shown in FIGS. 20(b) and 20(c), respectively.

At time t2, as shown in FIG. 21, the terminal B starts communication. With the start of communication in the terminal B, the base station apparatus 20 determines modulation schemes and the like corresponding to the interfering power notified from the terminal B, and starts data transmission. Herein, as shown in FIG. 21(b), as the modulation scheme, QPSK is selected in subcarrier numbers 1 to 8, while 16QAM is selected in subcarrier numbers 9 to 12. In addition, with the start of communication in the terminal B, the interfering power levels estimated by the terminals A and C increase as shown in FIGS. 21(a) and 21(c), respectively.

At time t3, as shown in FIG. 22, the terminal C starts communication. With the start of communication in the terminal C, the base station apparatus 20 determines modulation schemes and the like corresponding to the interfering power notified from the terminal C, and starts data transmission. Herein, as shown in FIG. 22(c), as the modulation scheme, BPSK is selected in all the subcarriers. In addition, with the start of communication in the terminal C, the interfering power levels estimated by the terminals A and B increase as shown in FIGS. 22(a) and 22(b), respectively.

Since time t4 is set as the control update timing for the terminal A, the update processing of the modulation scheme and the like is performed for the terminal A. With the update of the modulation scheme and the like, the base station apparatus 20 determines the modulation scheme and the like corresponding to the interfering power notified from the terminal A, and starts data communication. At this point, as distinct from time t1, the interfering power level estimated by the terminal A increases largely. Herein, as shown in FIG. 23(a), as the modulation scheme, BPSK is selected in subcarrier numbers 1 to 4 and 6 to 10, while QPSK is selected in subcarrier numbers 11 and 12. Subcarrier number 5 is set for a carrier hole. In addition, with the update processing of the modulation scheme and the like for the terminal A, the interfering power levels estimated by the terminals B and C increase as shown in FIGS. 23(b) and 23(c), respectively.

Similarly, since time t5 is set as the control update timing for the terminal B, the update processing of the modulation scheme and the like is performed for the terminal B. With the update of the modulation scheme and the like, the base station apparatus 20 determines the modulation scheme and the like corresponding to the interfering power notified from the terminal B, and starts data transmission. At this point, as distinct from time t2, the interfering power level estimated by the terminal B increases. Herein, as shown in FIG. 24(b), as the modulation scheme, BPSK is selected in subcarrier numbers 1 to 3 and 6 to 10, QPSK is selected in subcarrier number 5, and 16QAM is selected in subcarrier numbers 11 and 12. Subcarrier number 4 is set for a carrier hole. In addition, with the update processing of the modulation scheme and the like for the terminal B, the interfering power levels estimated by the terminals A and C increase as shown in FIGS. 24(a) and 24(c), respectively.

At time t5, as shown in FIG. 24, since BPSK is selected as almost modulation schemes in data transmission to the terminals A to C, the data transmission can be executed only by the modulation scheme with a relatively low modulation level. As a result, the numbers of bits per OFDM symbol that can be transmitted to the terminals A, B and C are respectively "13", "18" and "10", and it is understood that the total throughput decreases in the wireless communication system.

The present invention was carried out in view of the foregoing, and it is an object of the invention to provide a wireless receiver, wireless transmitter and wireless communication system for reducing interference mutually provided among peripheral cells, and enabling data transmission to be performed while maintaining the total throughput at the maximum level.

Means for Solving the Problem (1) In order to achieve the above-mentioned object, the invention provides following means. In other words, a wireless transmitter according to the invention is characterized by having an acquiring section that acquires information of interfering power level that a communication apparatus receives from peripheral cells from a signal received from the communication apparatus, a determining section that determines the number of subcarriers to use in data transmission corresponding to the information of interfering power level, and a modulation scheme determining section that determines a modulation scheme for each of the subcarriers to use in data transmission corresponding to the information of interfering power level, and transmitting a radio signal to the communication apparatus using the modulation scheme determined in the modulation scheme determining section and the number of subcarriers determined in the determining section.

Thus, since a radio signal is transmitted to the communication apparatus using the modulation scheme determined in the modulation scheme determining section and the number of subcarriers determined corresponding to the information of interfering power level, it is possible to limit the number of subcarriers to use in data transmission. It is thereby possible to reduce the interference mutually provided among peripheral cells as compared with the case of using all the subcarriers in data transmission in principle as in the typical OFDM system, and to perform data transmission while maintaining the total throughput at the maximum level.

(2) Further, in the wireless transmitter according to the invention, the modulation scheme determining section is characterized by setting a carrier hole on a subcarrier except subcarriers contained in the number of subcarriers to use in data transmission determined in the determining section.

Thus, since a carrier hole is set on a subcarrier except subcarriers contained in the number of subcarriers to use in data transmission determined in the determining section, it is possible to reduce the interference mutually provided among peripheral cells in the subcarrier set for a carrier hole, and to perform data transmission while maintaining the total throughput at the maximum level.

(3) Further, in the wireless transmitter according to the invention, the determining section is characterized by determining the number of subcarriers to use in data transmission corresponding to the total sum of interfering power levels of all the subcarriers contained in the information of interfering power level.

Thus, since the number of subcarriers to use in data transmission is determined corresponding to the total sum of interfering power levels of all the subcarriers contained in the information of interfering power level, it is possible to increase/decrease the number of subcarriers to use in data transmission corresponding to the total sum of interfering power levels of all the subcarriers. As a result, it is possible to perform control to decrease the number of subcarriers to use in data transmission when the total sum of interfering power levels of all the subcarriers is larger than a predetermined value, while increasing the number of subcarriers to use in data transmission when the total sum of interfering power levels of all the subcarriers is smaller than the predetermined value.

(4) Further, in the wireless transmitter according to the invention, the determining section is characterized by determining the number of subcarriers to use in data transmission by comparing the total sum of interfering power levels of all the subcarriers with a predetermined threshold.

Thus, since the number of subcarriers to use in data transmission is determined by comparing the total sum of interfering power levels of all the subcarriers with a predetermined threshold, it is possible to increase/decrease the number of subcarriers to use in data transmission corresponding to a result of comparison with the predetermined threshold. By setting beforehand a plurality of thresholds and comparing the total sum of interfering power levels of all the subcarriers with the plurality of thresholds, it is possible to accurately determine the number of subcarriers to use in data transmission corresponding to the interfering power level.

(5) Further, in the wireless transmitter according to the invention, the determining section is characterized by determining subcarriers contained in the number of subcarriers to use in data transmission in ascending order of interfering power level of subcarriers based on the information of interfering power level.

Thus, since the subcarriers contained in the number of subcarriers to use in data transmission are determined from subcarriers with lower interfering power levels based on the information of interfering power level, it is possible to perform data transmission while maintaining the throughput to be the maximum corresponding to the current transmission path state.

(6) Further, a wireless transmitter according to the invention is characterized by having an acquiring section that acquires information of interfering power level that a communication apparatus receives from peripheral cells from a signal received from the communication apparatus, a modulation scheme determining section that determines a modulation scheme for each subcarrier to use in data transmission corresponding to the information of interfering power level, and a determining section that determines a beforehand set modulation level number to designate a rank of each of a plurality of modulation schemes ranked corresponding to the modulation level, corresponding to the information of interfering power level, and transmitting a radio signal to the communication apparatus using the modulation scheme determined in the modulation scheme determining section and subcarriers capable of being modulated with the modulation scheme corresponding to the modulation level number determined in the determining section.

Thus, since a radio signal is transmitted to the communication apparatus using the modulation scheme determined in the modulation scheme determining section and subcarriers capable of being modulated with the modulation scheme corresponding to the modulation level number determined corresponding to the information of interfering power level, it is possible to limit the number of subcarriers to use in data transmission. It is thereby possible to reduce the interference mutually provided among peripheral cells as compared with the case of using all the subcarriers in data transmission in principle as in the typical OFDM system, and to perform data transmission while maintaining the total throughput at the maximum level.

(7) Further, in the wireless transmitter according to the invention, the modulation scheme determining section is characterized by setting a carrier hole on a subcarrier except subcarriers capable of being modulated with the modulation scheme corresponding to the modulation level number determined in the determining section.

Thus, since a carrier hole is set on a subcarrier except subcarriers capable of being modulated with the modulation scheme corresponding to the modulation level number determined in the determining section, it is possible to reduce the interference mutually provided among peripheral cells in the subcarrier set for a carrier hole, and to perform data transmission while maintaining the total throughput at the maximum level.

(8) Further, in the wireless transmitter according to the invention, the determining section is characterized by determining the modulation level number corresponding to the total sum of interfering power levels of all the subcarriers contained in the information of interfering power level.

Thus, since the modulation level number is determined corresponding to the total sum of interfering power levels of all the subcarriers contained in the information of interfering power level, it is possible to increase/decrease the modulation level number corresponding to the total sum of interfering power levels of all the subcarriers. As a result, it is possible to perform control to decrease the modulation level number when the total sum of interfering power levels of all the subcarriers is larger than a predetermined value, while increasing the modulation level number when the total sum of interfering power levels of all the subcarriers is smaller than the predetermined value.

(9) Further, in the wireless transmitter according to the invention, the determining section is characterized by determining the modulation level number by comparing the total sum of interfering power levels of all the subcarriers with a predetermined threshold.

Thus, since the modulation level number is determined by comparing the total sum of interfering power levels of all the subcarriers with a predetermined threshold, it is possible to increase/decrease the modulation level corresponding to a result of comparison with the predetermined threshold. By setting beforehand a plurality of thresholds and comparing the total sum of interfering power levels of all the subcarriers with the plurality of thresholds, it is possible to accurately determine the modulation level number corresponding to the interfering power level.

(10) Further, a wireless receiver according to the invention is characterized by having a measuring section that measures interfering power received from peripheral cells from a signal received from a communication apparatus, and a combining section that combines a measurement result of the interfering power measured in the measuring section as information of interfering power level with transmission data, and transmitting the transmission data with the information of interfering power level combined therewith as a radio signal to the communication apparatus.

Thus, since the transmission data with the information of interfering power level including the measurement result of interfering power measured in the measuring section combined therewith is transmitted as a radio signal to the communication apparatus, it is possible to notify the communication apparatus of the interfering power level that the wireless receiver receives from peripheral cells. By the communication apparatus limiting the number of subcarriers to use in data transmission corresponding to the information of interfering power level, it is possible to reduce the interference mutually provided among peripheral cells as compared with the case of using all the subcarriers in data transmission in principle as in the typical OFDM system, and to perform data transmission while maintaining the total throughput at the maximum level.

(11) Further, a base station apparatus according to the invention is characterized by having the wireless transmitter as described in any one of claims 1 to 9.

According to this constitution, since the base station apparatus is able to limit the number of subcarriers to use in data transmission corresponding to the information of interfering power level in the communication apparatus (mobile station apparatus), it is possible to reduce the interference mutually provided among peripheral cells as compared with the case of using all the subcarriers in data transmission in principle as in the typical OFDM system, and to perform data transmission while maintaining the total throughput at the maximum level.

(12) Further, a mobile station apparatus according to the invention is characterized by having the wireless receiver as described in claim 10.

According to this constitution, the mobile station apparatus is able to notify the communication apparatus (base station apparatus) of the interfering power level received from peripheral cells. By the communication apparatus (base station apparatus) limiting the number of subcarriers to use in data transmission corresponding to the information of interfering power level, it is possible to reduce the interference mutually provided among peripheral cells as compared with the case of using all the subcarriers in data transmission in principle as in the typical OFDM system, and to perform data transmission while maintaining the total throughput at the maximum level.

(13) Further, a wireless communication system according to the invention is characterized by having the base station apparatus as described in claim 11 and the mobile station apparatus as described in claim 12.

According to this constitution, since the base station apparatus is able to limit the number of subcarriers to use in data transmission corresponding to the information of interfering power level notified from the mobile station apparatus, it is possible to reduce the interference mutually provided among peripheral cells as compared with the case of using all the subcarriers in data transmission in principle as in the typical OFDM system, and to perform data transmission while maintaining the total throughput at the maximum level.

According to the invention, it is possible to reduce the interference mutually provided among peripheral cells, and to perform data transmission while maintaining the total throughput at the maximum level.

BEST MODES FOR CARRYING OUT THE INVENTION

First Embodiment

A wireless communication system according to the first embodiment is to determine the number of subcarriers to use in data transmission from a base station apparatus to a mobile station apparatus based on the total sum of interfering power levels of all the subcarriers notified from the mobile station apparatus in the cell, set modulation schemes and the like corresponding to the interfering power levels associated with a determined number of subcarriers, while setting the other subcarrier(s) for a carrier hole(s), and perform data transmission. It is thereby intended to reduce the interfering power level imposed on mobile station apparatuses in adjacent cells.

Figure 1:
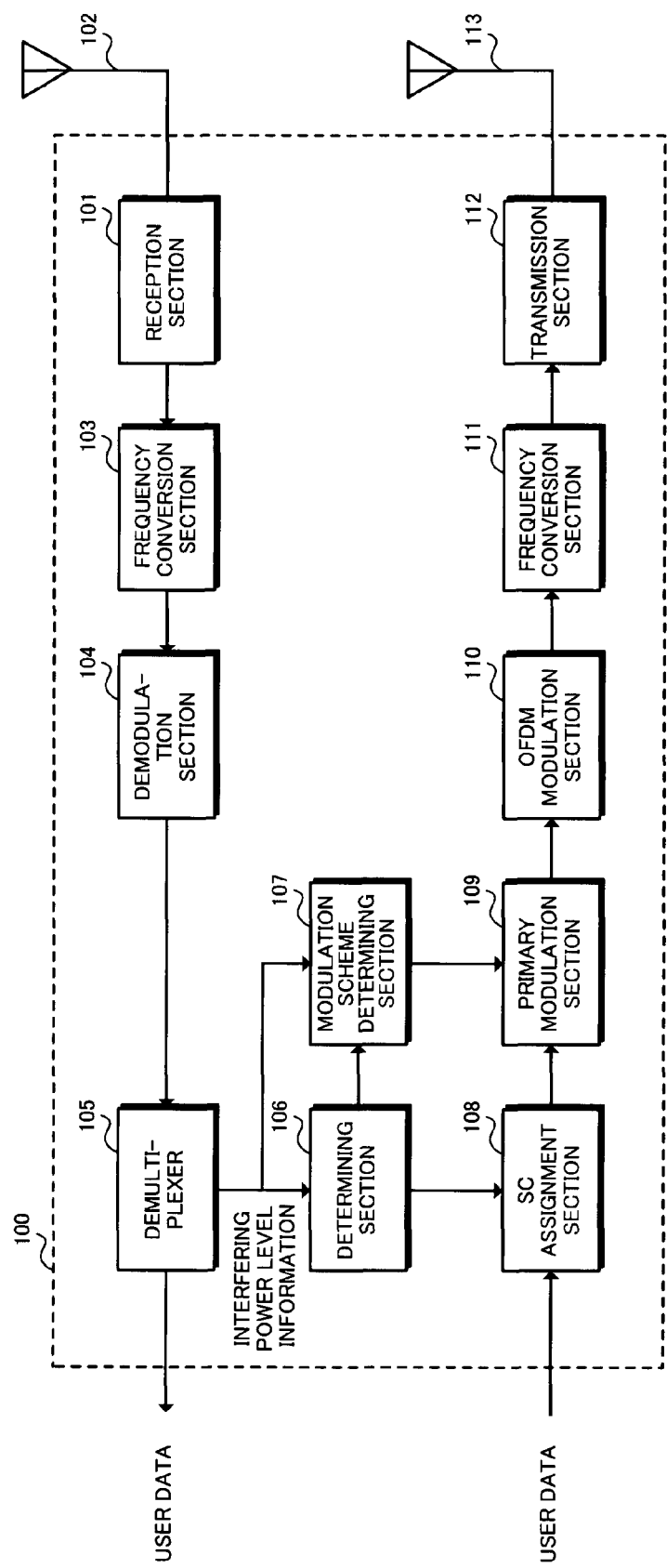
FIG. 1 is a block diagram illustrating a configuration of a base station apparatus in a wireless communication system according to the first embodiment.
Figure 2:
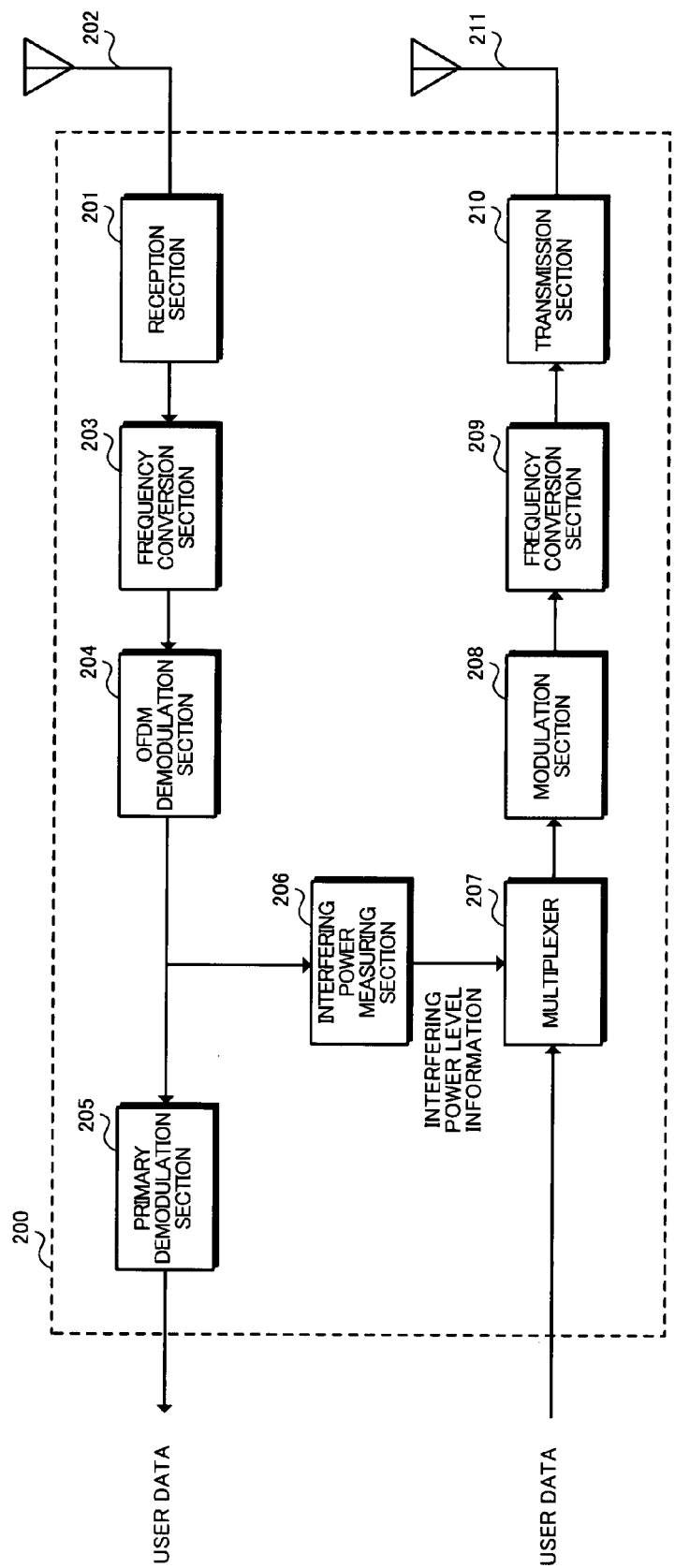
FIG. 2 is a block diagram illustrating a configuration of a mobile station apparatus in the wireless communication system according to the first embodiment.

Described below are configuration examples of a base station apparatus 100 and mobile station apparatus 200 in the wireless communication system according to the first embodiment. FIG. 1 is a block diagram illustrating a configuration of the base station apparatus 100 in the wireless communication system according to the first embodiment. FIG. 2 is a block diagram illustrating a configuration of the mobile station apparatus 200 in the wireless communication system according to the first embodiment.

In the base station apparatus 100 as shown in FIG. 1, a reception section 101 receives a signal (hereinafter, referred to as an "RF signal") in an RF (Radio Frequency) band arriving via a reception antenna 102, and outputs the RF signal to a frequency conversion section 103. Further, the reception section 101 performs synchronization processing to obtain OFDM symbol data. The frequency conversion section 103 converts the RF signal delivered from the reception section 101 into an electrical signal to output to a demodulation section 104. The demodulation section 104 demodulates the electrical signal delivered from the frequency conversion section 103, and outputs the demodulated reception data (user data) to a demultiplexer 105.

The demultiplexer 105 extracts information (hereinafter, referred to as "interfering power level information") on the interfering power level estimated in the mobile station apparatus 200 from the reception data (user data) input from the demodulation section 104 to output to a determining section 106 and modulation scheme determining section 107. Further, the demultiplexer 105 outputs the reception data except the interfering power level information to a data processing apparatus (not shown). The demodulation section 104 and demultiplexer 105 constitute the acquiring section. The determining section 106 determines the number of subcarriers to use in data transmission corresponding to the interfering power level information input from the demultiplexer 105 while determining subcarrier numbers to use, and notifies these pieces of information to a subcarrier (SC) assignment control section 108. Further, the determining section 106 notifies the modulation scheme determining section 107 of the determined number of subcarriers. The modulation scheme determining section 107 determines a modulation scheme for each subcarrier corresponding to the interfering power level information input from the demultiplexer 105 to notify a primary modulation section 109. In determining a modulation scheme, the modulation scheme determining section 107 determines modulation schemes corresponding to the number of used subcarriers notified from the determining section 106, and sets the other subcarriers for carrier holes.

The SC assignment control section 108 assigns designated transmission data (user data) to subcarriers, corresponding to the number of subcarriers and subcarrier numbers notified from the determining section 106. The primary modulation section 109 modulates the transmission data input from the SC assignment control section 107 according to the modulation scheme notified from the modulation scheme determining section 107. An OFDM modulation section 110 performs Fourier transform on the transmission data input from the SC assignment control section 107 to generate an OFDM signal, and outputs the OFDM signal to a frequency conversion section 111. The frequency conversion section 111 converts the OFDM signal input as an electrical signal from the OFDM modulation section 110 into an RF signal. A transmission section 112 transmits the RF signal delivered from the frequency conversion section 111 via a transmission antenna 113.

Meanwhile, in the mobile station apparatus 200 as shown in FIG. 2, a reception section 201 receives an RF signal arriving via a reception antenna 202, and outputs the RF signal to a frequency conversion section 203. Further, the reception section 201 performs synchronization processing to obtain OFSM symbol data. The frequency conversion section 203 converts the RF signal delivered from the reception section 201 into an electrical signal to output to an OFDM demodulation section 204. The OFDM demodulation section 204 performs inverse Fourier transform on the OFDM signal delivered as an electrical signal from the frequency conversion section 203, and outputs the transformed signal to a primary demodulation section 205 and interfering power measuring section 206.

The primary demodulation section 205 performs demodulation processing corresponding to the modulation scheme set for each subcarrier on the signal input from the OFDM demodulation section 204, and thereby obtains reception data (user data) to output to a data processing apparatus (not shown). The interfering power measuring section 206 measures interfering power from the signal input from the OFDM demodulation section 204, and notifies a multiplexer 207 of the measurement result as interfering power level information. The multiplexer 207 combines the user data input from the data processing apparatus (not shown) and the interfering power level information notified from the interfering power measuring section 206 to output to a modulation section 208. The multiplexer 207 constitutes a combining section. The modulation section 208 modulates the transmission data input from the multiplexer 207 to output to a frequency conversion section 209. The frequency conversion section 209 converts the RF signal input as an electrical signal from the modulation section 208 into an RF signal. A transmission section 210 transmits the RF signal delivered from the frequency conversion section 209 via a transmission antenna 211.

Figure 3:
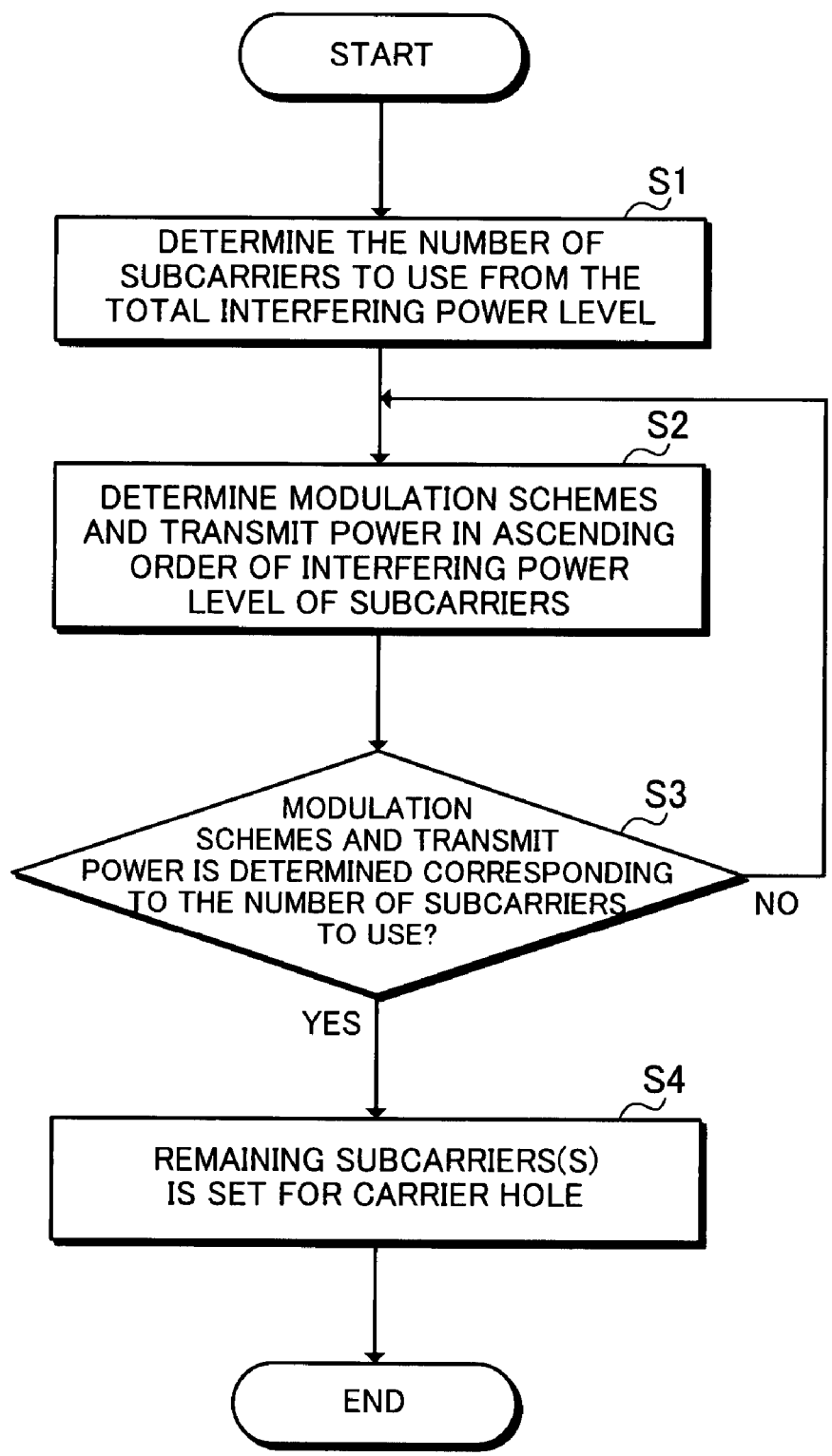
FIG. 3 is a flowchart to explain the operation of setting modulation schemes and the like to use in data transmission in the base station apparatus 100 according to the first embodiment.

Described next is the operation of setting the modulation schemes and the like to use in data transmission in the base station apparatus 100 with the above-mentioned configuration. FIG. 3 is a flowchart to explain the operation of setting the modulation schemes and the like to use in data transmission in the base station apparatus 100 according to the first embodiment.

Upon receiving a signal transmitted from the mobile station apparatus 200 with the reception antenna 102, the base station apparatus 100 extracts the interfering power level information estimated in the mobile station apparatus 200 in the demultiplexer 105. When the interfering power level is extracted, the determining section 106 calculates the total sum (hereinafter, referred to as a "total interfering power level") of interfering power levels of all the subcarriers, and determines the number of subcarriers (SC) to use from the total interfering power level (step S1). The determined number of used subcarriers is notified to the modulation scheme determining section 107.

For the determination of the number of subcarriers, for example, three, low, middle and high, thresholds (T1, T2 and T3) are beforehand set, twelve subcarriers are used when the total interfering power level is smaller than the threshold T1, six subcarriers are used when the total interfering power level is larger than the threshold T1 but smaller than the threshold T2, four subcarriers are used when the total interfering power level is larger than the threshold T2 but smaller than the threshold T3, and data transmission is not performed when the total interfering power level is larger than the threshold T3. In addition, the determination of the number of subcarriers is not limited thereto, and any other methods may be used for the determination.

Next, the base station apparatus 100 determines modulation schemes and transmit power of the subcarriers sequentially in ascending order of the interfering power level of the subcarrier (step S2). In addition, the modulation schemes of subcarriers and the like are assumed to be determined by the known method. At this point, the base station apparatus 100 makes a determination whether the modulation scheme determining section 107 determines the modulation schemes and transmit power corresponding to the number of used subcarriers notified from the determining section 106 (step S3).

When the modulation schemes and the like are determined corresponding to the number of using subcarriers, the base station apparatus 100 sets remaining subcarriers for which modulation schemes and the like are not determined for carrier holes in the modulation scheme determining section 107 (step S4). Thus, the number of used subcarriers is determined corresponding to the total interfering power level, and data transmission is performed using a determined number of used subcarriers in ascending order of the interfering power level. In addition, when the modulation schemes and the like are not determined corresponding to the number of used subcarriers, the processing of steps S2 and S3 is repeated.

Figure 16:
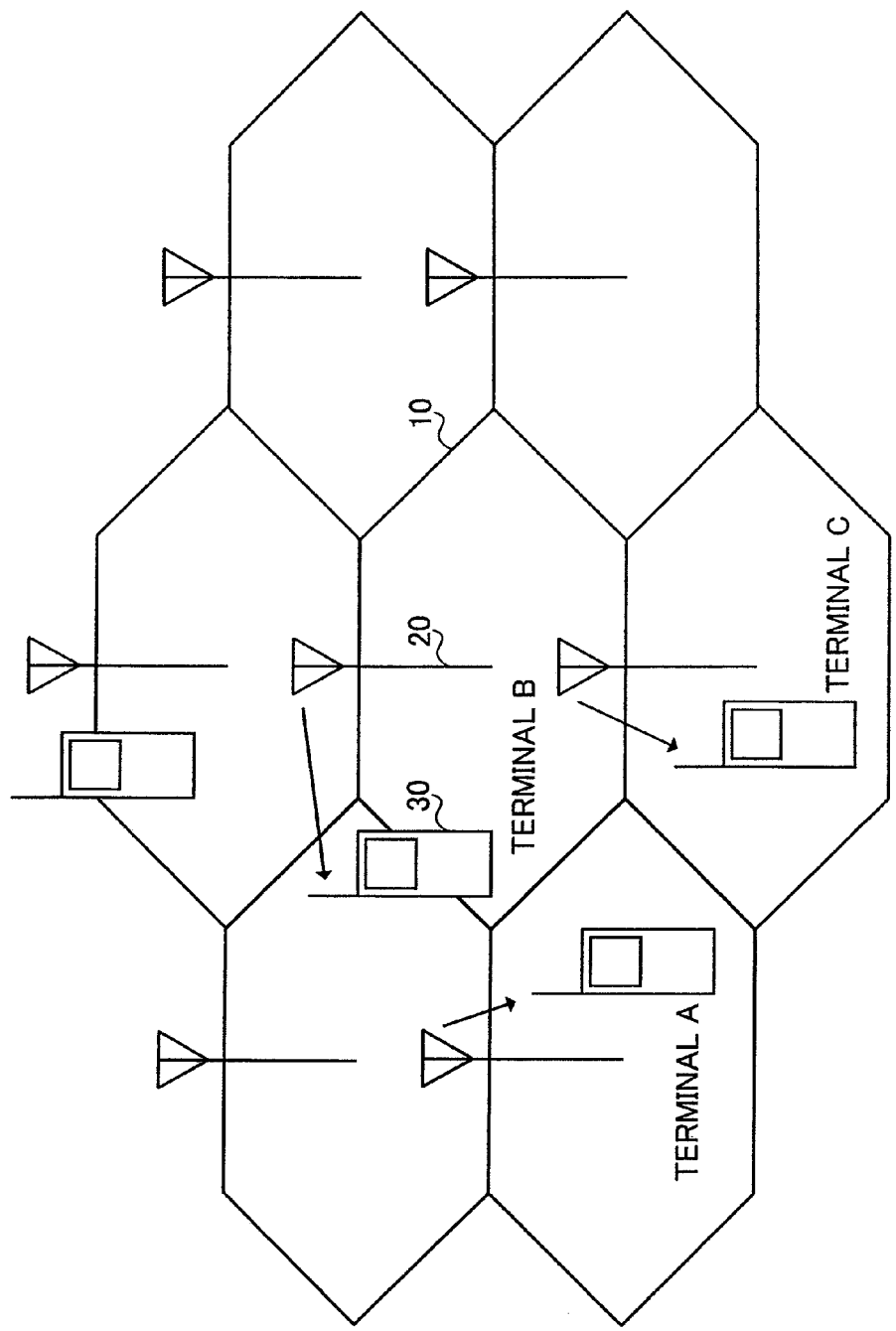
FIG. 16 is a diagram showing a configuration example of a wireless communication system for performing communication using the OFDM system applying MTPC.
Figure 17:
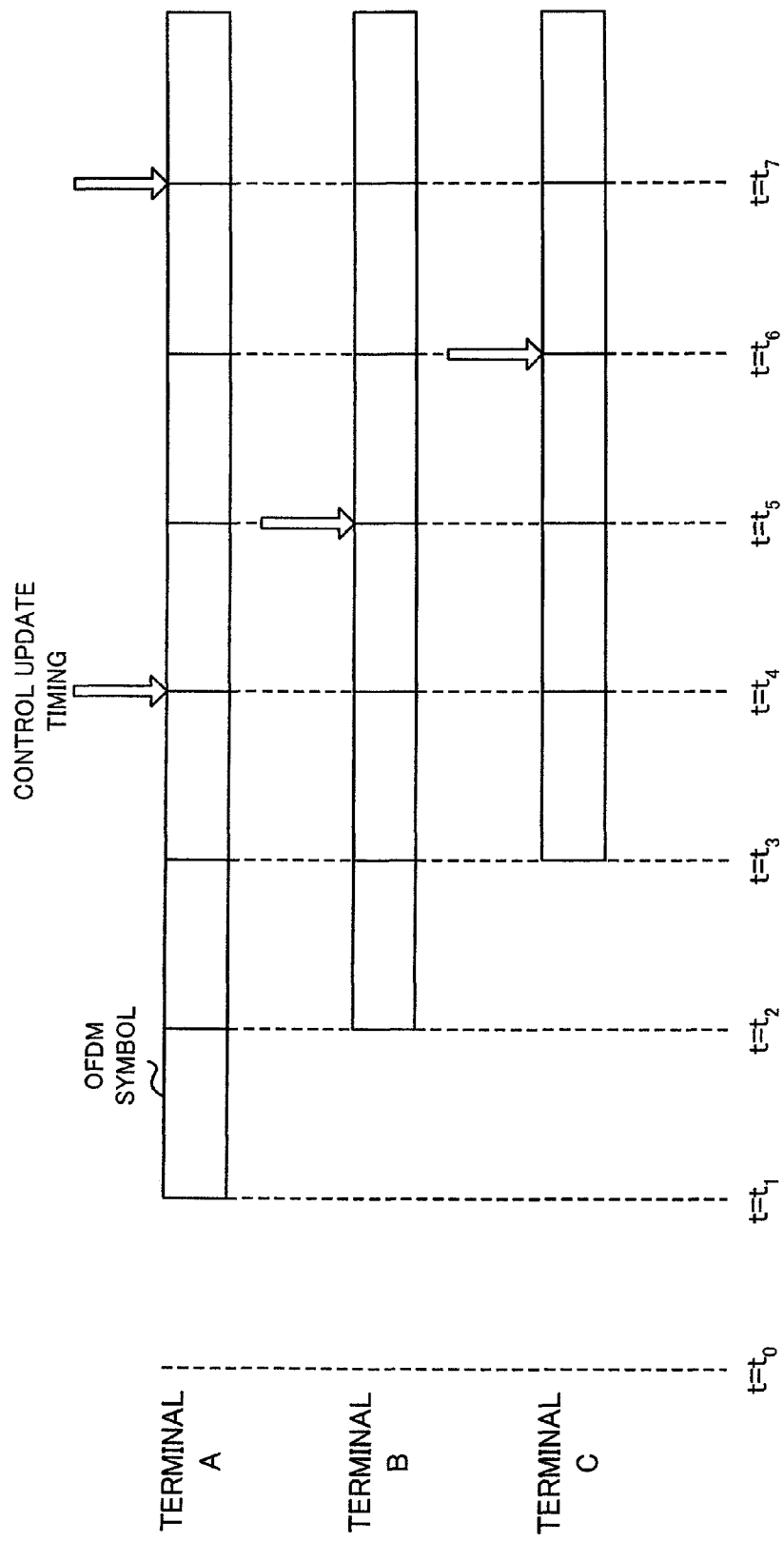
FIG. 17 is a diagram showing a structure of a frame transmitting to a mobile station apparatus in the cell from each base station apparatus in the wireless communication system as shown in FIG. 16.
Figure 18:
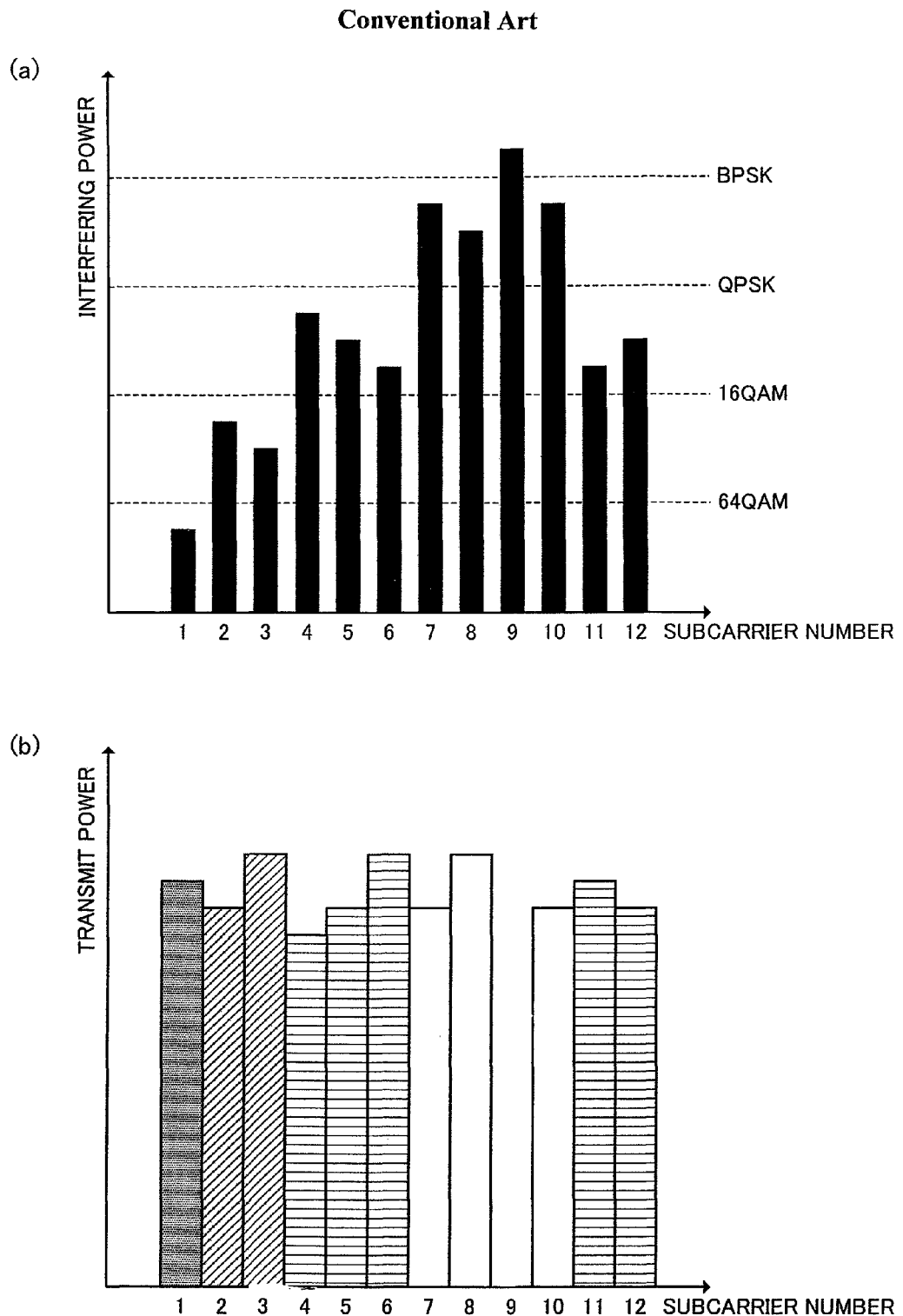
FIG. 18 contains graphs to explain the method of determining the modulation scheme and the like of each subcarrier in each base station apparatus.
Figure 19:
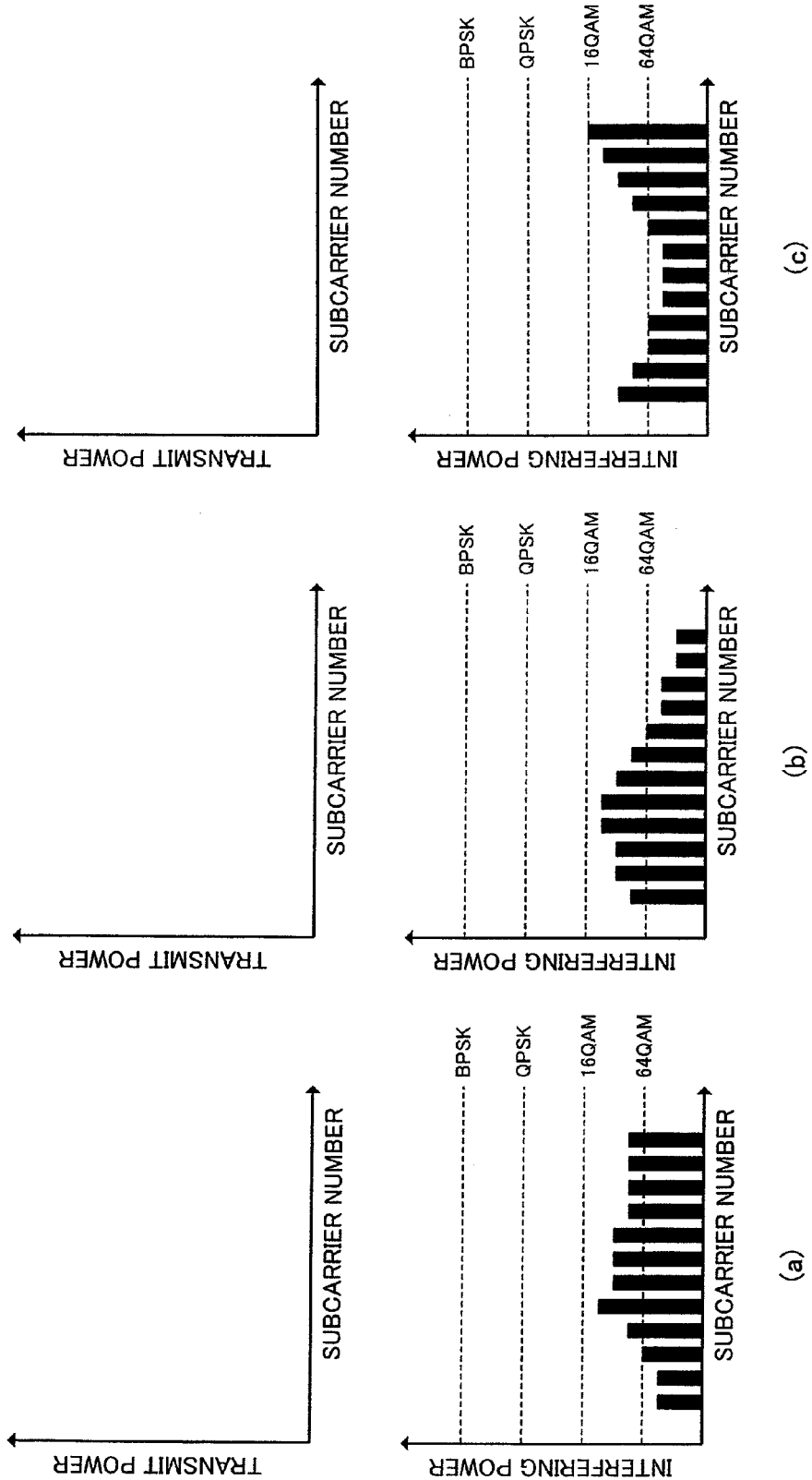
FIG. 19 contains graphs illustrating the relationship between the interfering power and the transmission spectrum when the modulation scheme and the like are determined according to the method as shown in FIG. 18 and data transmission is performed by each base station apparatus in the conventional wireless communication system.
Figure 20:
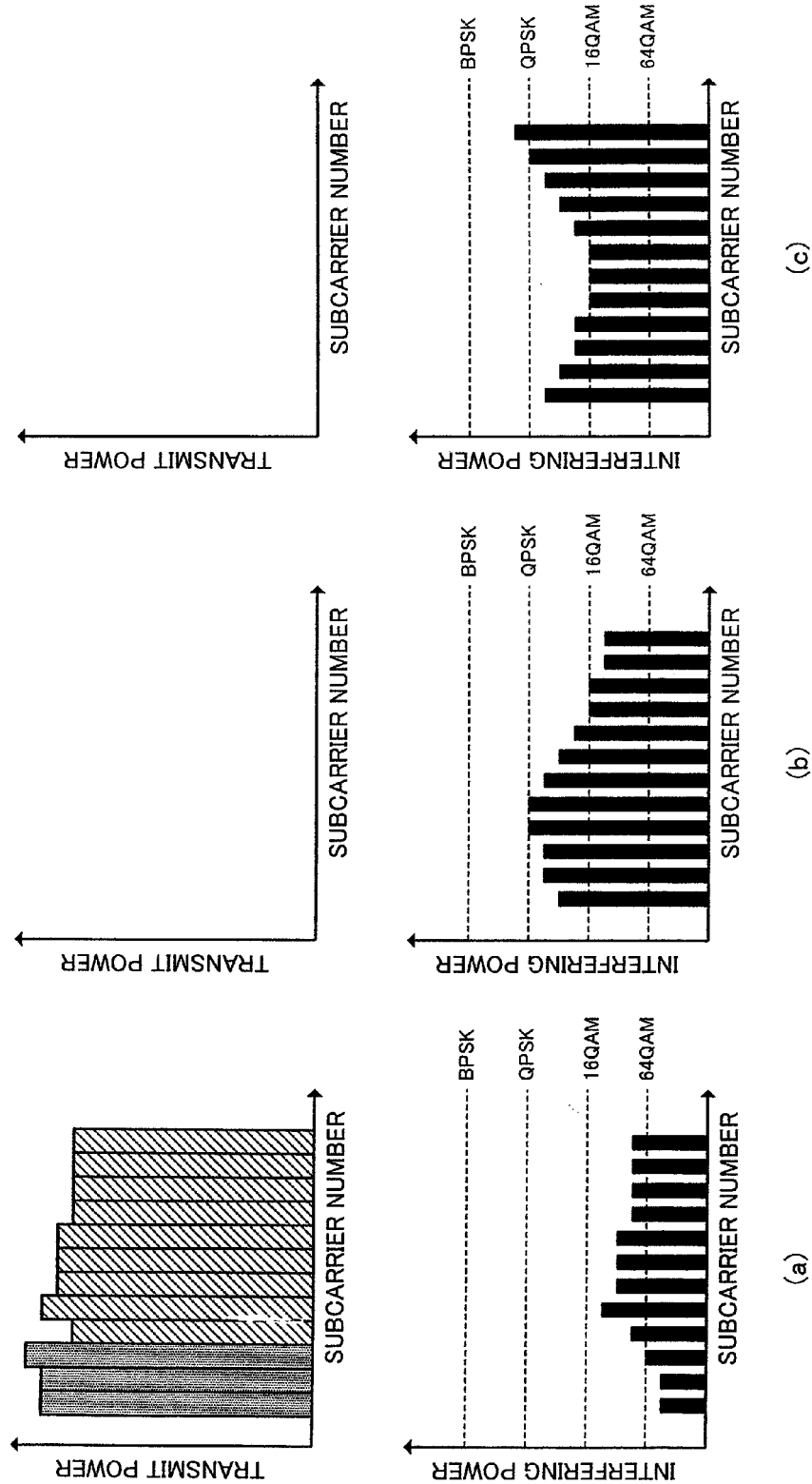
FIG. 20 contains graphs illustrating the relationship between the interfering power and the transmission spectrum when the modulation scheme and the like are determined according to the method as shown in FIG. 18 and data transmission is performed by each base station apparatus in the conventional wireless communication system.
Figure 21:
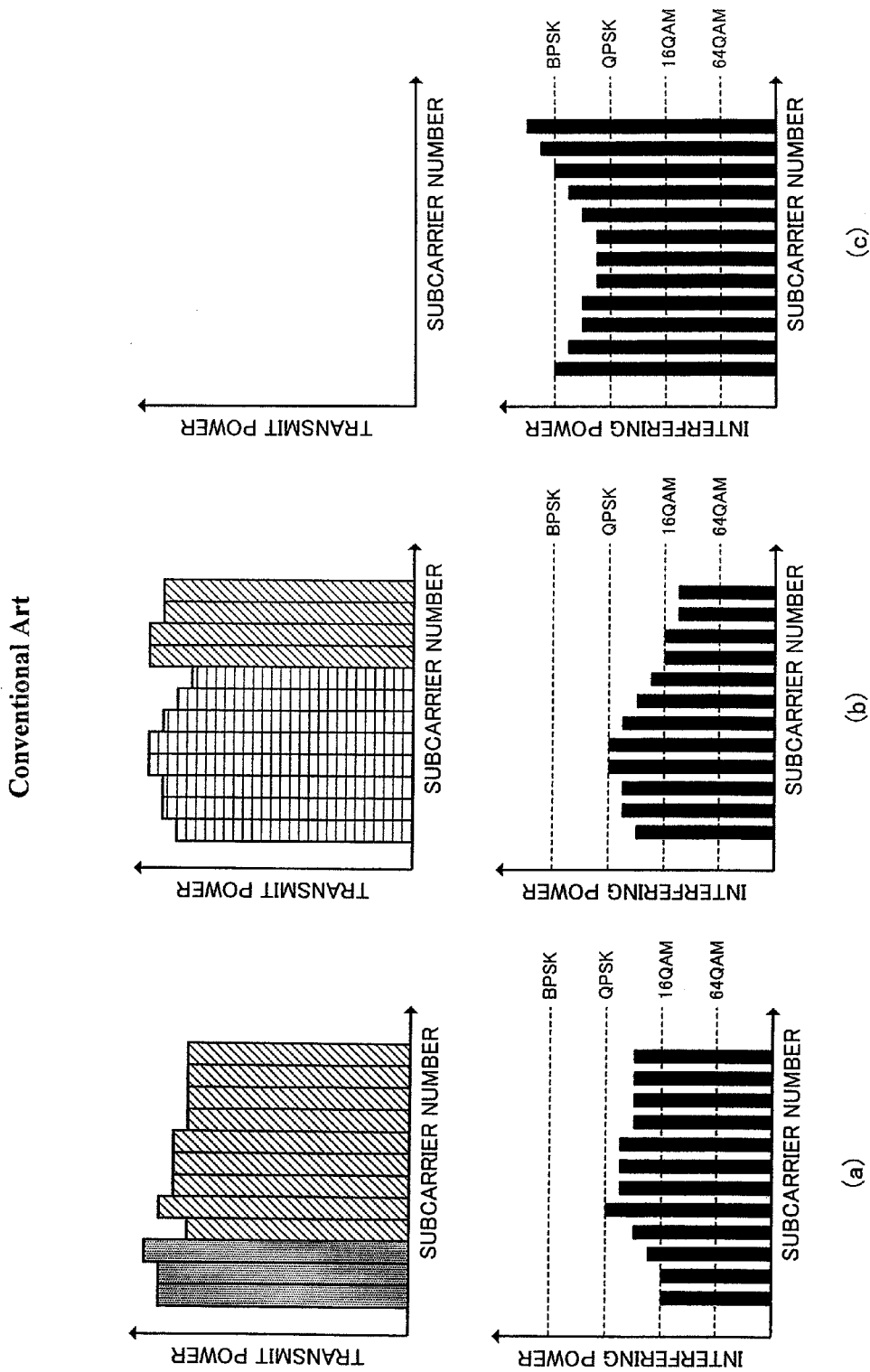
FIG. 21 contains graphs illustrating the relationship between the interfering power and the transmission spectrum when the modulation scheme and the like are determined according to the method as shown in FIG. 18 and data transmission is performed by each base station apparatus in the conventional wireless communication system.
Figure 22:
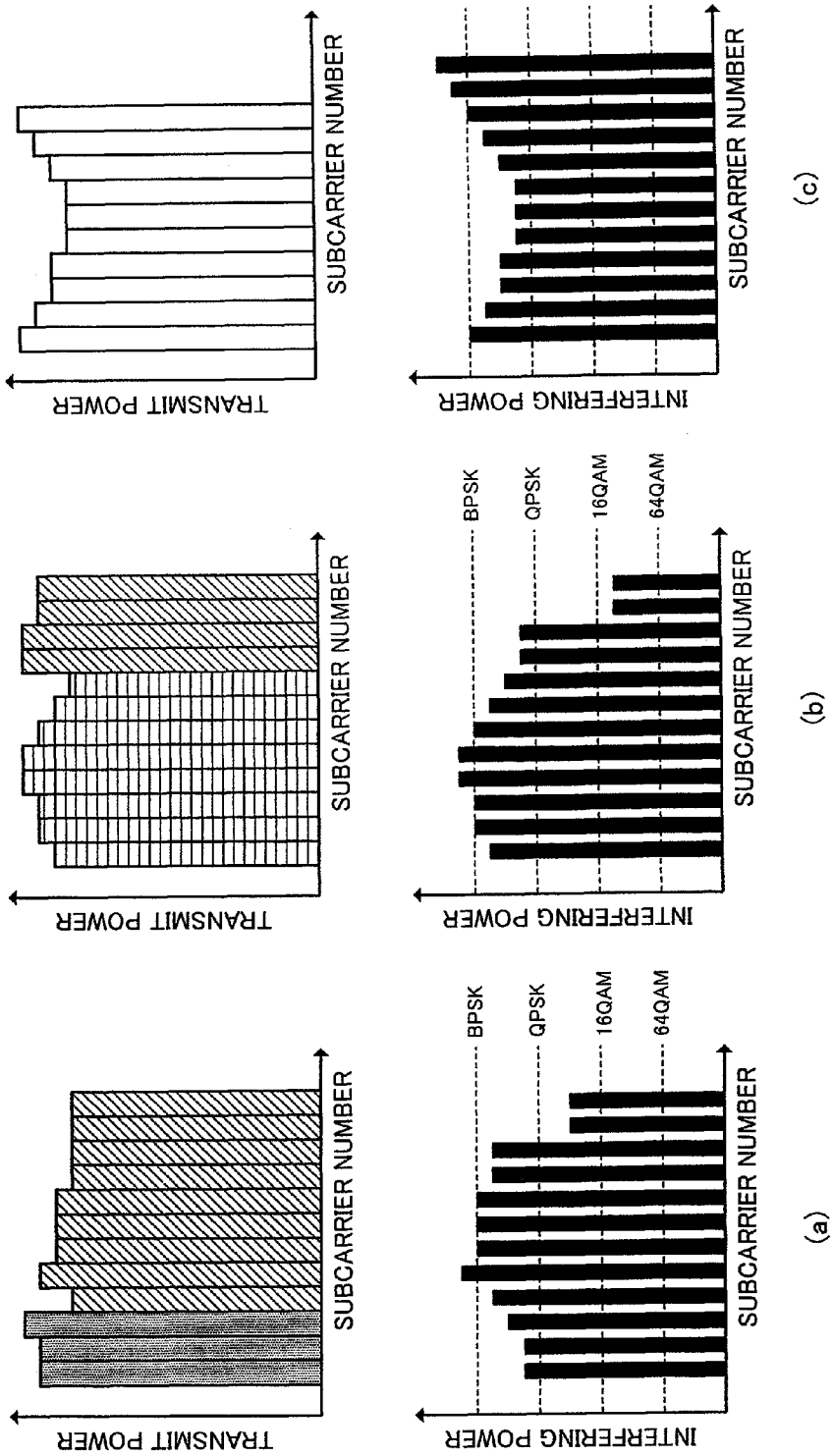
FIG. 22 contains graphs illustrating the relationship between the interfering power and the transmission spectrum when the modulation scheme and the like are determined according to the method as shown in FIG. 18 and data transmission is performed by each base station apparatus in the conventional wireless communication system.
Figure 23:
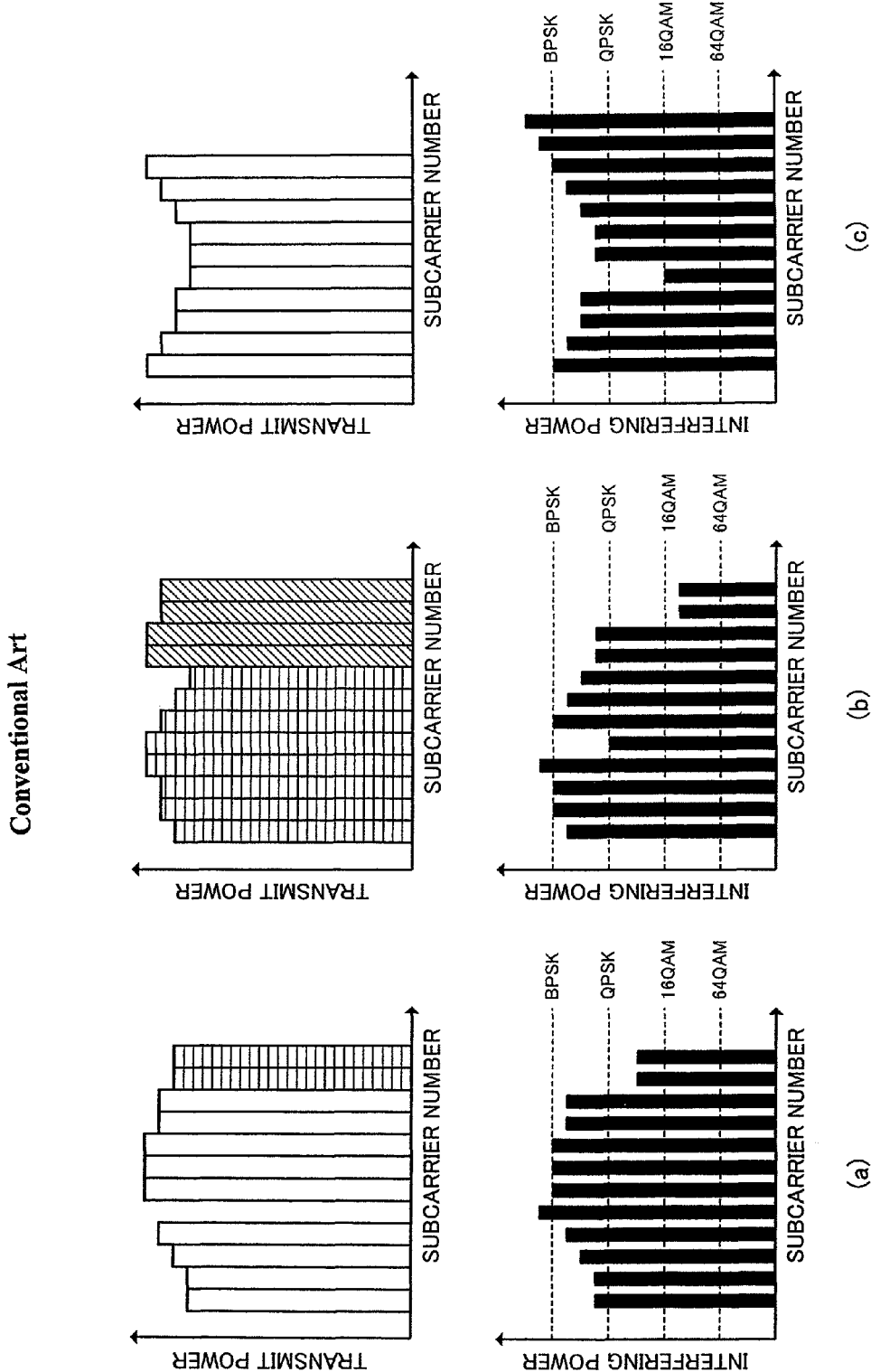
FIG. 23 contains graphs illustrating the relationship between the interfering power and the transmission spectrum when the modulation scheme and the like are determined according to the method as shown in FIG. 18 and data transmission is performed by each base station apparatus in the conventional wireless communication system.

Referring to FIGS. 4 to 9, described below is the relationship between the interfering power and the transmission spectrum when the modulation schemes and the like are determined using the above-mentioned determination method to perform data transmission. Herein, for convenience in descriptions, the explanation is assumed to be made on the case that each base station apparatus 100 transmits data to the terminal A, terminal B or terminal C as shown in FIG. 16 according to the frame structure as shown in FIG. 17. Each of FIGS. 4 to 9 shows the relationship between the interfering power in each terminal at time t0 to t5 as shown in FIG. 17 and the transmission spectrum to each terminal. In each of FIGS. 4 to 9, (*a*), (*b*) and (*c*) show the relationship between the interfering power estimated by the terminal A, B or C and the transmission spectrum corresponding to the interfering power, respectively.

Figure 4:
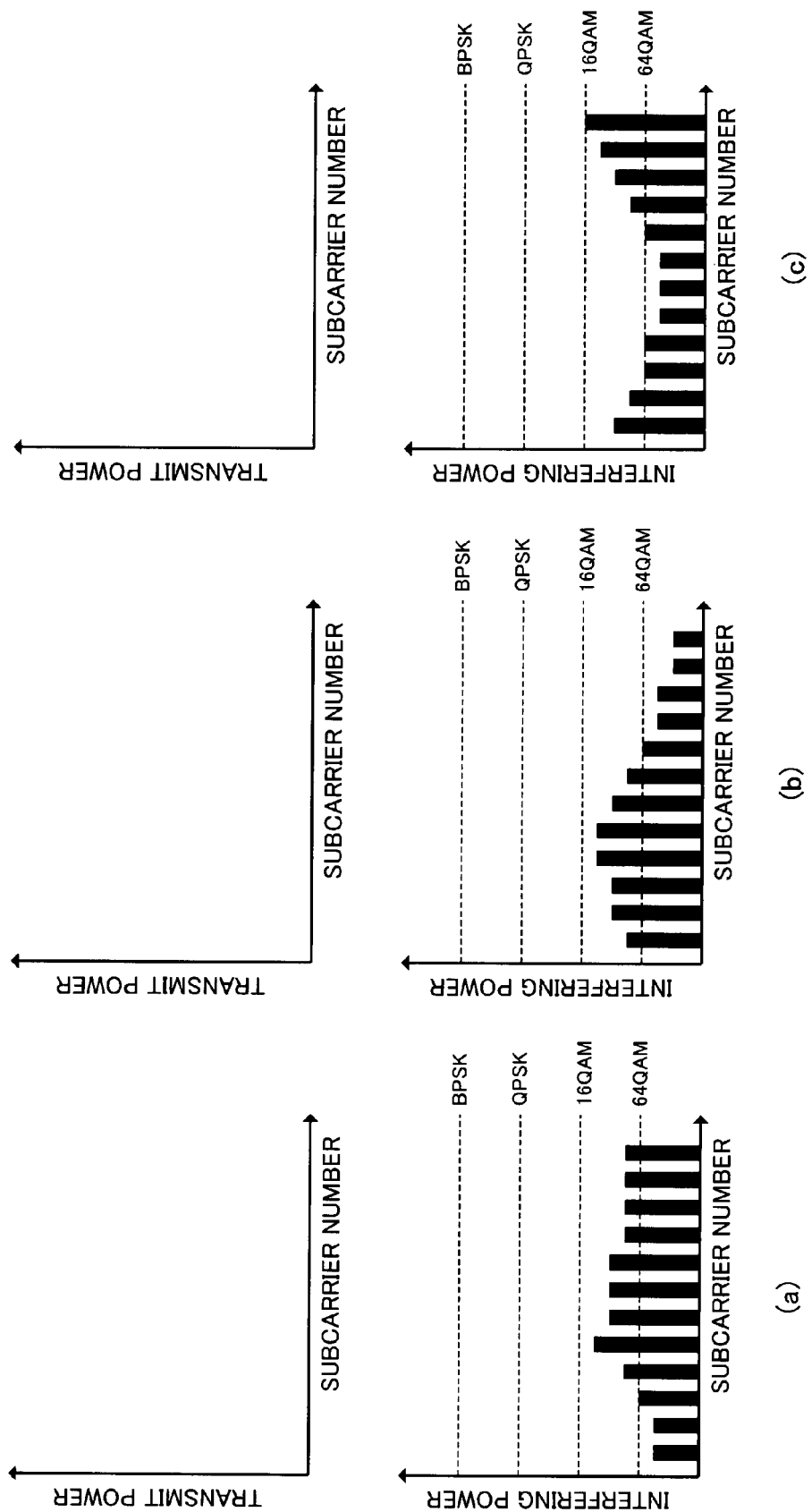
FIG. 4 contains graphs illustrating the relationship between the interfering power and the transmission spectrum when the modulation schemes and the like are determined according to the method as shown in FIG. 3 and data transmission is performed in the base station apparatus according to the first embodiment.

At time t0, as shown in FIG. 4, since any terminals do not start communication, any base station apparatuses 100 do not provide transmit power. Therefore, the transmission spectrum does not appear in any terminals.

Figure 5:
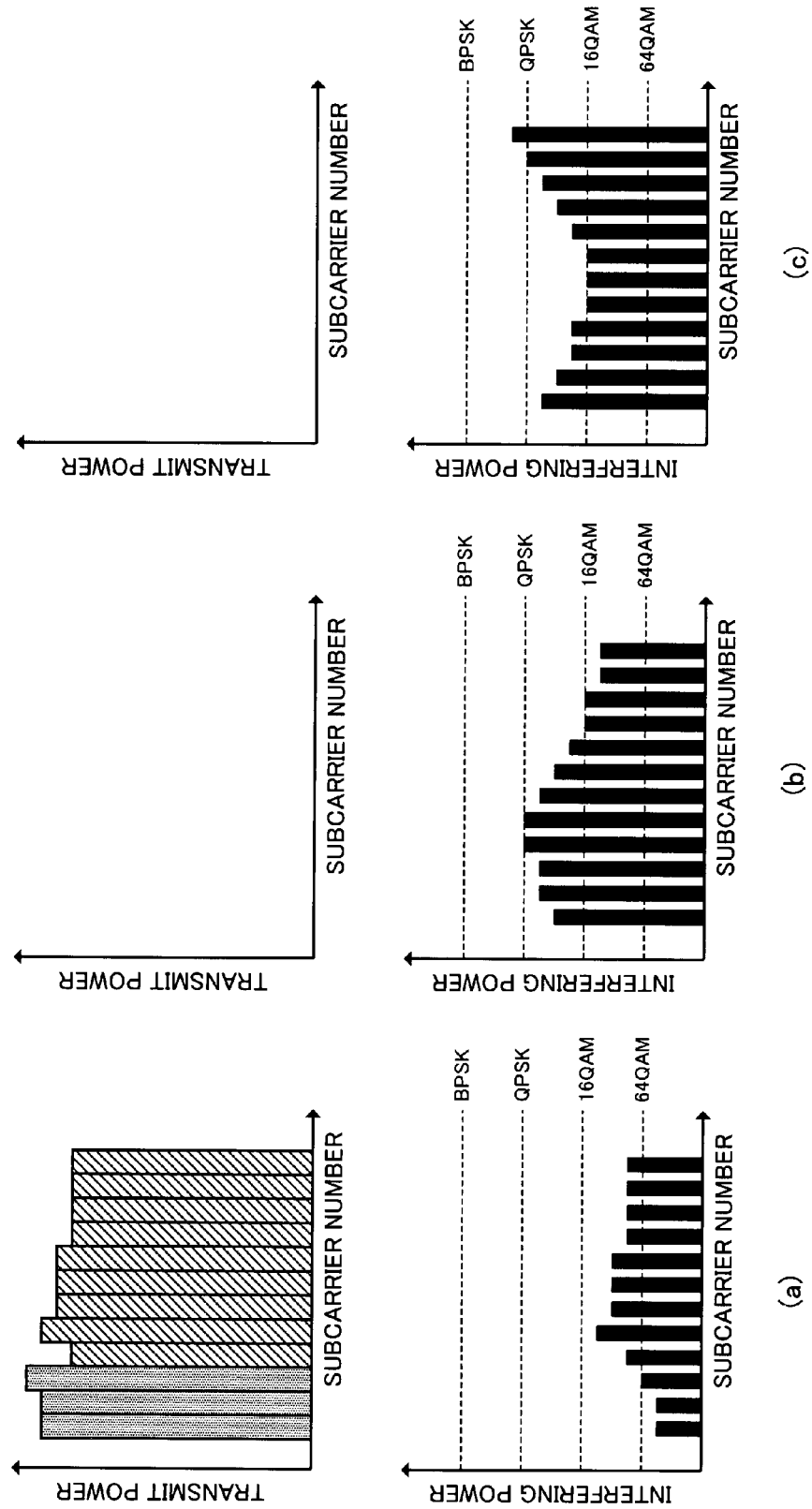
FIG. 5 contains graphs illustrating the relationship between the interfering power and the transmission spectrum when the modulation schemes and the like are determined according to the method as shown in FIG. 3 and data transmission is performed in the base station apparatus according to the first embodiment.

At time t1, as shown in FIG. 5, the terminal A starts communication. With the start of communication in the terminal A, the base station apparatus 100 determines modulation schemes and the like corresponding to the interfering power notified from the terminal A, and starts data transmission. At this point, the base station apparatus 100 determines the number of used subcarriers corresponding to the total interfering power level notified from the terminal A. Herein, the case is shown that since the total interfering power level is smaller than the above-mentioned threshold T1, the number of used subcarriers is twelve. The modulation schemes are assumed to be determined by the known method. Herein, as shown in FIG. 5(*a*), as the modulation scheme, 64QAM is selected in subcarrier numbers 1 to 3, while 16QAM is selected in subcarrier numbers 4 to 12. In addition, with the start of communication in the terminal A, the interfering power levels estimated by the terminals B and C increase as shown in FIGS. 5(*b*) and 5(*c*), respectively.

Figure 6:
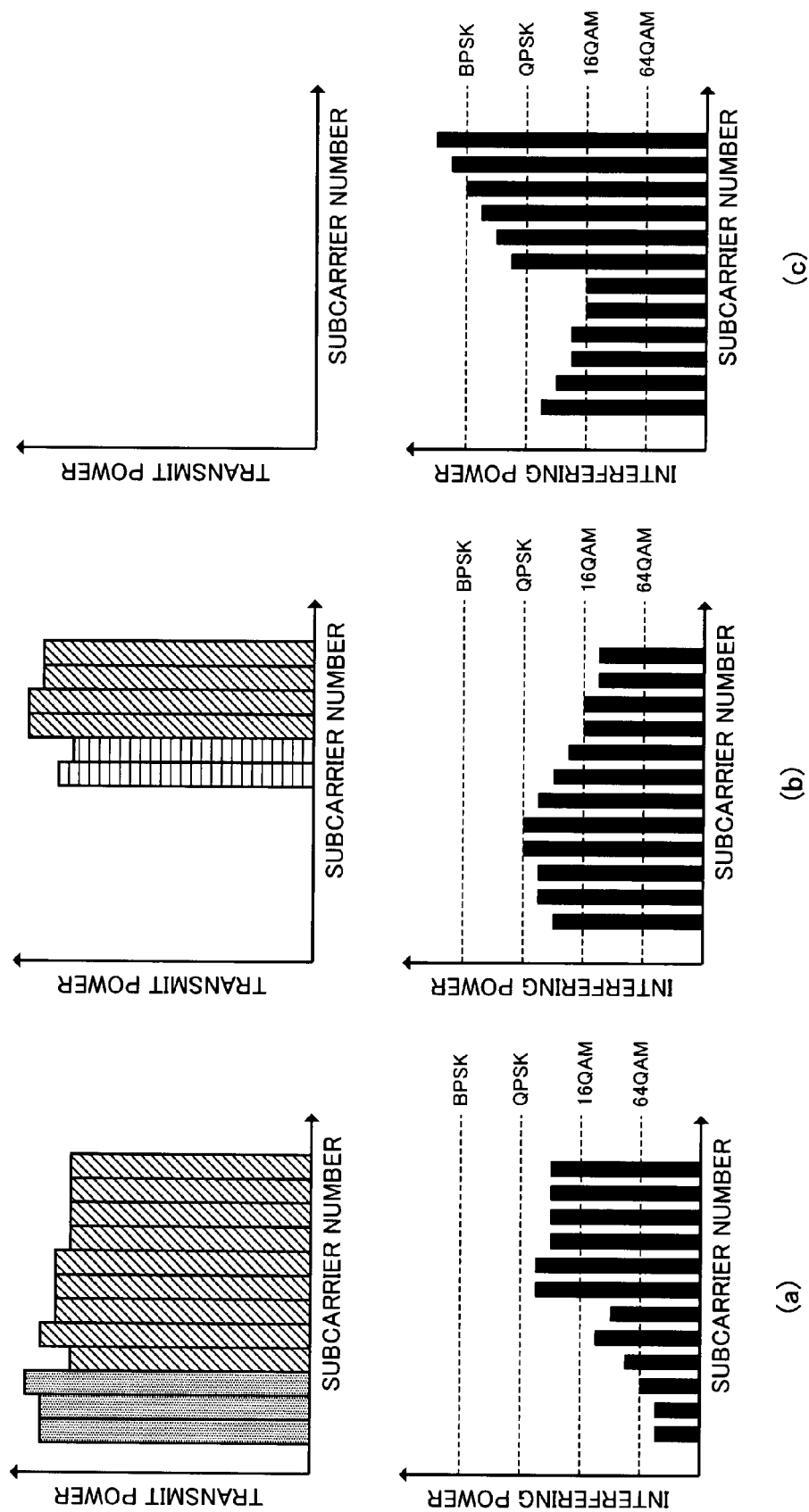
FIG. 6 contains graphs illustrating the relationship between the interfering power and the transmission spectrum when the modulation schemes and the like are determined according to the method as shown in FIG. 3 and data transmission is performed in the base station apparatus according to the first embodiment.

At time t2, as shown in FIG. 6, the terminal B starts communication. With the start of communication in the terminal B, the base station apparatus 100 determines modulation schemes and the like corresponding to the interfering power notified from the terminal B, and starts data transmission. At this point, the base station apparatus 100 determines the number of used subcarriers corresponding to the total interfering power level notified from the terminal B. Herein, the case is shown that since the total interfering power level is smaller than the above-mentioned threshold T1 but larger than the threshold T2, the number of used subcarriers is six. Further, the case is described that among the interfering power as shown in FIG. 6(*b*), six subcarriers with smallest levels are selected i.e. subcarriers numbers 7 to 12 are selected. Herein, as shown in FIG. 6(*b*), as the modulation scheme, QPSK is selected in subcarrier numbers 7 and 8, while 16QAM is selected in subcarrier numbers 9 to 12. The other subcarrier numbers, 1 to 6, are set for carrier holes. In addition, with the start of communication in the terminal B, the interfering power levels estimated by the terminals A and C increase as shown in FIGS. 6(*a*) and 6(*c*), respectively.

Figure 7:
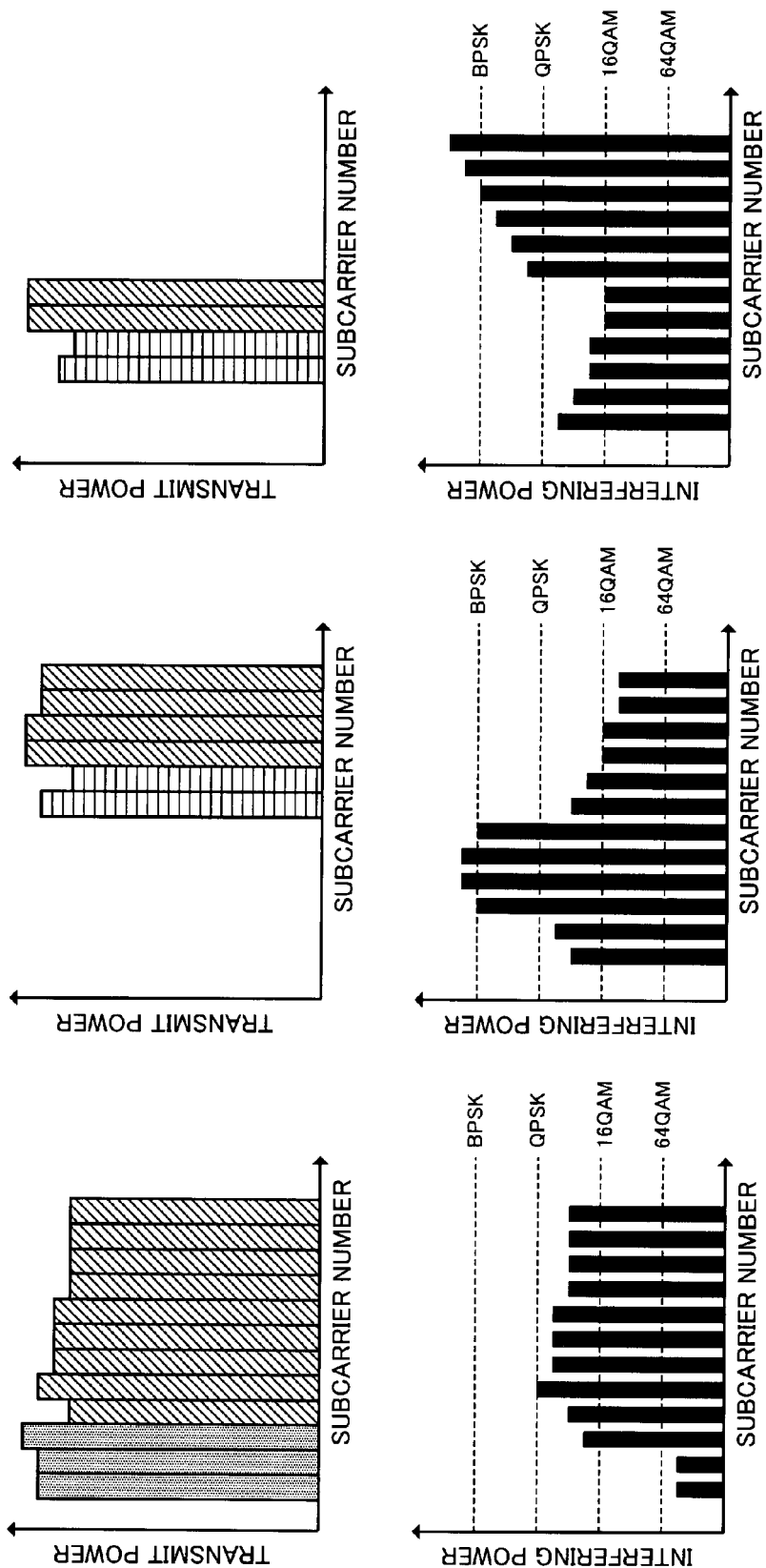
FIG. 7 contains graphs illustrating the relationship between the interfering power and the transmission spectrum when the modulation schemes and the like are determined according to the method as shown in FIG. 3 and data transmission is performed in the base station apparatus according to the first embodiment.
Figure 8:
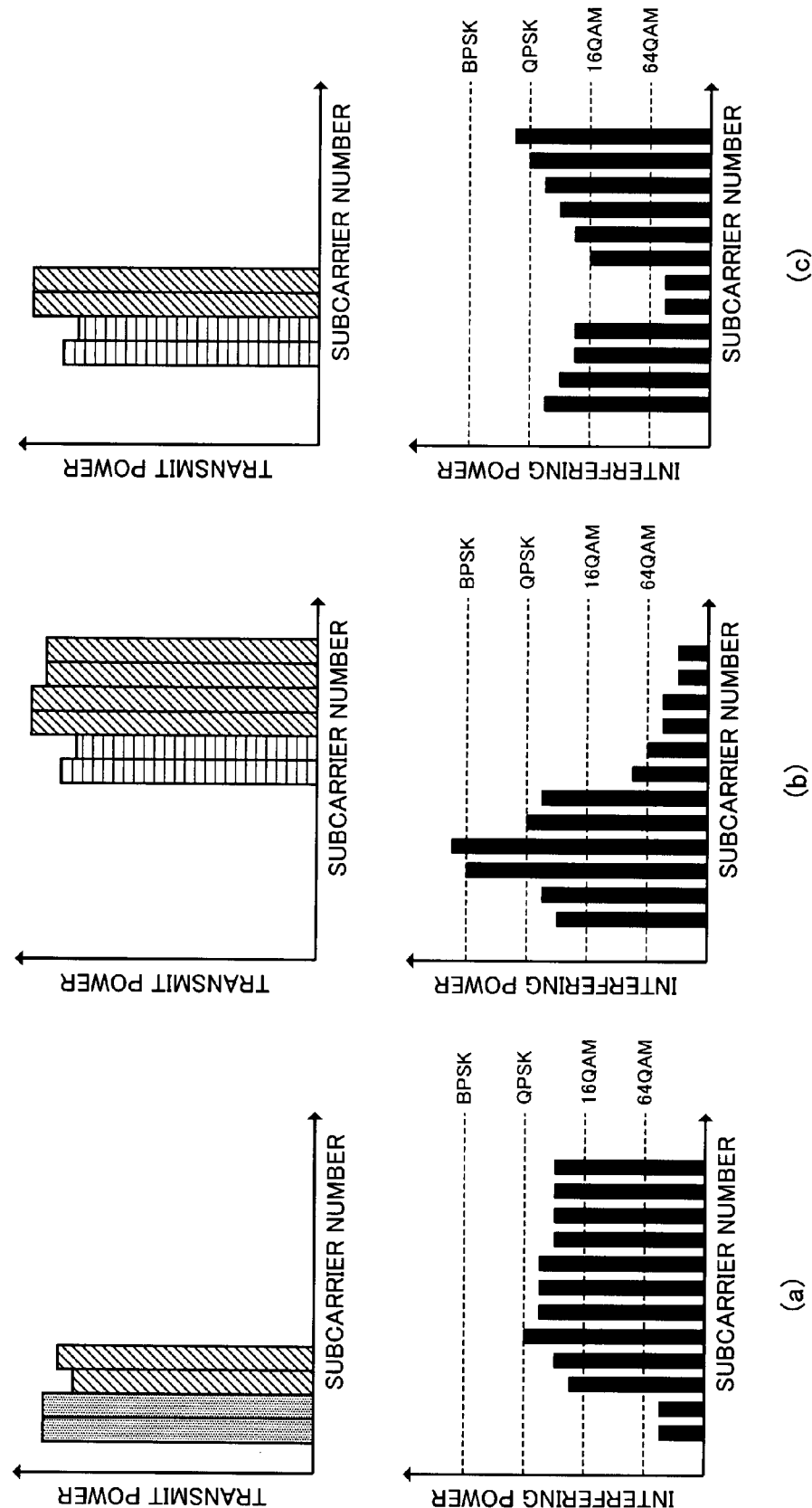
FIG. 8 contains graphs illustrating the relationship between the interfering power and the transmission spectrum when the modulation schemes and the like are determined according to the method as shown in FIG. 3 and data transmission is performed in the base station apparatus according to the first embodiment.

At time t3, as shown in FIG. 7, the terminal C starts communication. With the start of communication in the terminal C, the base station apparatus 100 determines modulation schemes and the like corresponding to the interfering power notified from the terminal C, and starts data transmission. At this point, the base station apparatus 100 determines the number of used subcarriers corresponding to the total interfering power level notified from the terminal C. Herein, the case is shown that since the total interfering power level is larger than the above-mentioned threshold T2 but smaller than the threshold T3, the number of used subcarriers is four. Further, the case is described that among the interfering power as shown in FIG. 7(*c*), four subcarriers with smallest levels are selected i.e. subcarriers numbers 3 to 6 are selected. Herein, as shown in FIG. 7(*c*), as the modulation scheme, QPSK is selected in subcarrier numbers 3 and 4, while 16QAM is selected in subcarrier numbers 5 to 6. The other subcarrier numbers, 1, 2 and 7 to 12, are set for carrier holes. In addition, with the start of communication in the terminal C, the interfering power levels estimated by the terminals A and B increase as shown in FIGS. 7(*a*) and 7(*b*), respectively.

Since time t4 is set as the control update timing for the terminal A, the update processing of the modulation scheme and the like is performed for the terminal A. With the update of the modulation scheme and the like, the base station apparatus 100 determines the modulation scheme and the like corresponding to the interfering power notified from the terminal A, and starts data communication. At this time, the base station apparatus 100 determines the number of used subcarriers corresponding to the total interfering power level notified from the terminal A. Herein, the case is shown that since the total interfering power level is larger than the abovementioned threshold T2 but smaller than the threshold T3, the number of used subcarriers is four. Further, the case is described that among the interfering power as shown in FIG. 8(a), four subcarriers with smallest levels are selected i.e. subcarriers numbers 1 to 4 are selected. Herein, as shown in FIG. 8(a), as the modulation scheme, 64QAM is selected in subcarrier numbers 1 and 2, while 16QAM is selected in subcarrier numbers 3 and 4. The other subcarrier numbers, 5 to 12, are set for carrier holes. In addition, with the update processing of the modulation scheme and the like for the terminal A, the interfering power levels estimated by the terminals B and C increase as shown in FIGS. 8(b) and 8(c), respectively.

Similarly, since time t5 is set as the control update timing for the terminal B, the update processing of the modulation scheme and the like is performed for the terminal B. With the update of the modulation scheme and the like, the base station apparatus 100 determines the modulation scheme and the like corresponding to the interfering power notified from the terminal B, and starts data communication. At this time, the base station apparatus 100 determines the number of used subcarriers corresponding to the total interfering power level notified from the terminal B. Herein, the case is shown that since the total interfering power level is larger than the abovementioned threshold T2 but smaller than the threshold T3, the number of used subcarriers is four. Further, the case is described that among the interfering power as shown in FIG. 9(b), four subcarriers with smallest levels are selected i.e. subcarriers numbers 9 to 12 are selected. Herein, as shown in FIG. 9(b), as the modulation scheme, 64QAM is selected in subcarrier numbers 9 to 12. The other subcarrier numbers, 1 to 8, are set for carrier holes. In addition, with the update processing of the modulation scheme and the like for the terminal B, the interfering power levels estimated by the terminals A and C increase as shown in FIGS. 9(a) and 9(c), respectively.

Figure 9:
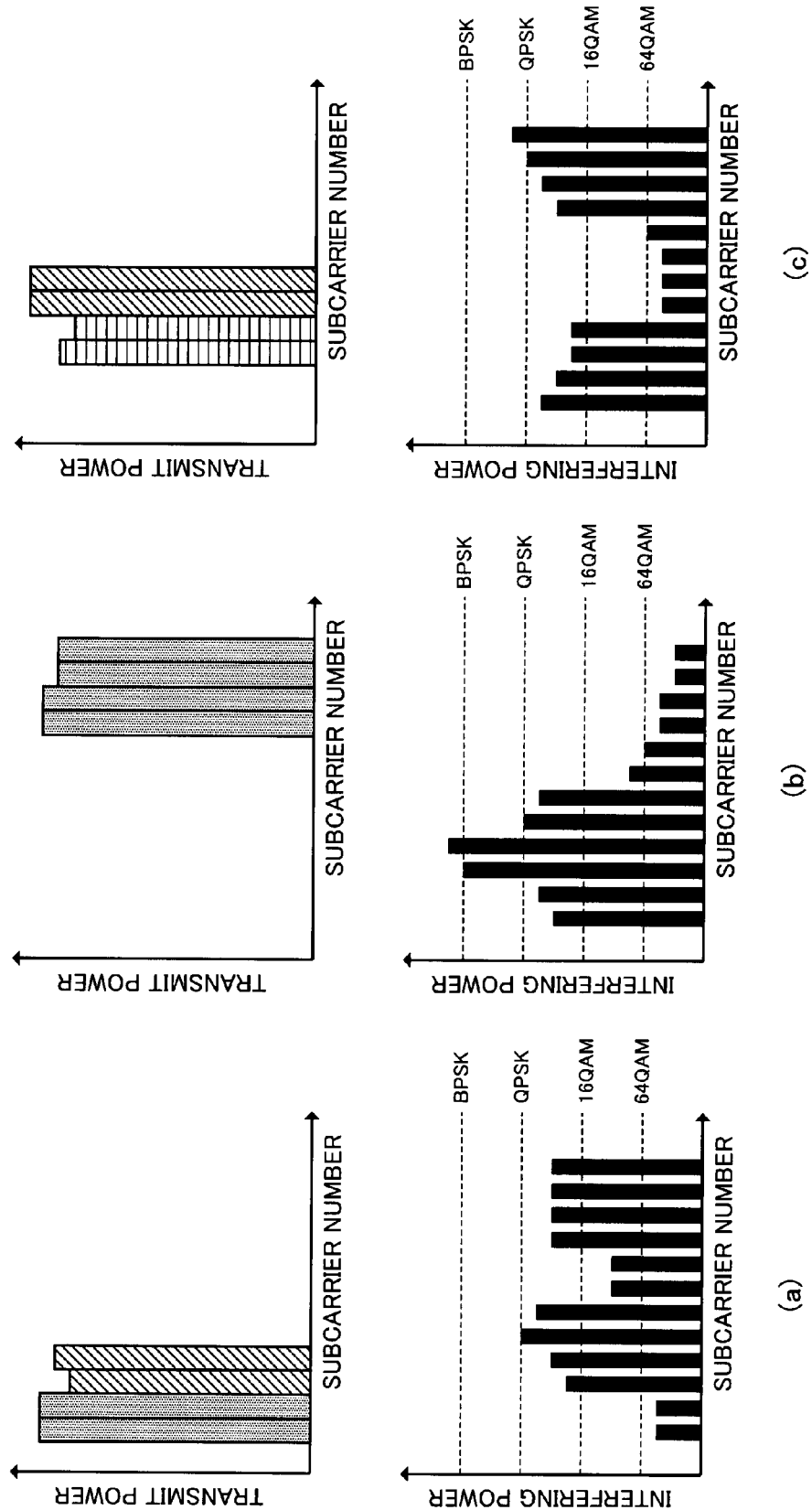
FIG. 9 contains graphs illustrating the relationship between the interfering power and the transmission spectrum when the modulation schemes and the like are determined according to the method as shown in FIG. 3 and data transmission is performed in the base station apparatus according to the first embodiment.
Figure 24:
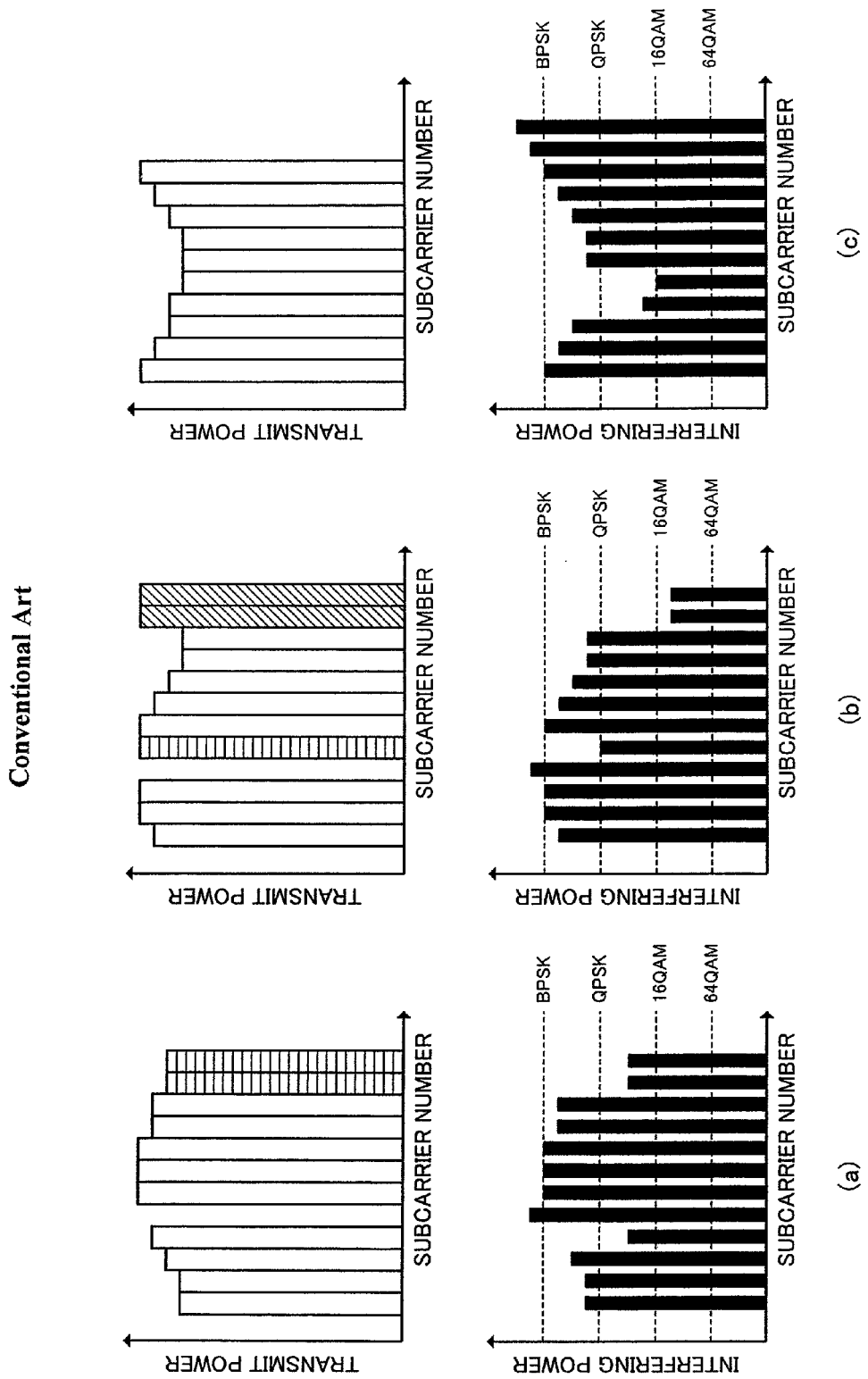
FIG. 24 contains graphs illustrating the relationship between the interfering power and the transmission spectrum when the modulation scheme and the like are determined according to the method as shown in FIG. 18 and data transmission is performed by each base station apparatus in the conventional wireless communication system.

At time t5, as shown in FIG. 9, data transmission is performed with subcarriers used by the mobile station apparatus 200 of each cell segregated on the frequency axis. As a result, at time t5, while the numbers of bits per OFDM symbol that can be transmitted to the terminals A, B and C are respectively "13", "18" and "10" (total 41 bits) in the case of determination by the known method as shown in FIG. 24, such numbers are "20", "24" and "12" (total 56 bits) according to the determination method of the wireless communication system in the first embodiment, and it is understood that the total throughput increases in the wireless communication system.

Thus, according to the wireless communication system according to the first embodiment, based on the total sum of interfering power levels of all the subcarriers notified from the mobile station apparatus 200 in the cell, determined is the number of subcarriers to use in data transmission from the base station apparatus 100 to the mobile station apparatus 200, the modulation schemes and the like are set corresponding to the interfering power levels associated with a determined number of subcarriers, while the other subcarrier (s) is set for a carrier hole, and data transmission is thus performed. It is thereby possible to reduce the interference mutually provided among peripheral cells, and to perform data transmission while maintaining the total throughput at the maximum level.

Second Embodiment

A wireless communication system according to the second embodiment is to prepare a plurality of modulation schemes ranked corresponding to the modulation level, determine the level number (hereinafter, referred to as a "modulation level number") of a modulation scheme to use in data transmission from a base station apparatus to a mobile station apparatus based on the total sum of interfering power levels of all the subcarriers notified from the mobile station apparatus in the cell, use subcarriers capable of being modulated with the modulation scheme corresponding to the determined modulation level number, while setting the other subcarrier(s) for a carrier hole(s), and perform data transmission. It is thereby intended to reduce the interfering power level imposed on mobile station apparatuses in adjacent cells.

A configuration example of a base station apparatus 100 in the wireless communication system according to the second embodiment is the same as that in the base station apparatus 100 in the first embodiment except the function of the determining section 106. In the base station apparatus 100 according to the second embodiment, the determining section 106 determines a modulation level number to use in data transmission corresponding to the interfering power level information input from the demultiplexer 105, while determining subcarrier numbers enabling modulation by the modulation scheme corresponding to the determined modulation level, notifies these pieces of information to the SC assignment control section 108, and in this respect, differs from the determining section 106 according to the first embodiment. In addition, a configuration example of a mobile station apparatus 200 in the wireless communication system according to the second embodiment is the same as that in the mobile station apparatus 200 according to the first embodiment.

Figure 10:
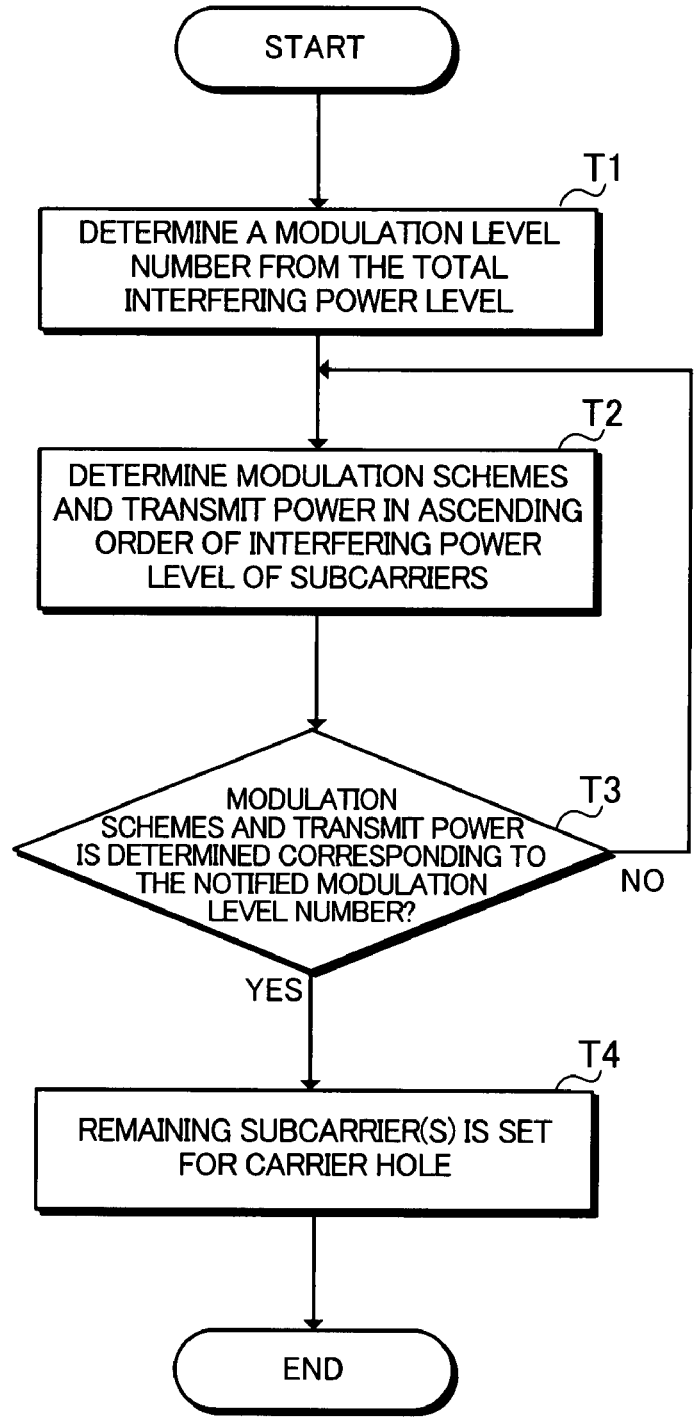
FIG. 10 is a flow chart to explain the operation of setting modulation schemes and the like to use in data transmission in a base station apparatus according to the second embodiment.

Described next is the operation of setting the modulation schemes and the like to use in data transmission in the base station apparatus 100 with the above-mentioned configuration. FIG. 10 is a flowchart to explain the operation of setting the modulation schemes and the like to use in data transmission in the base station apparatus 100 according to the second embodiment. It is herein assumed that 64QAM, 16QAM, QPSK and BPSK are set as a plurality of modulation schemes ranked corresponding to the modulation level.

Upon receiving a signal transmitted from the mobile station apparatus 200 with the reception antenna 102, the base station apparatus 100 extracts the interfering power level information estimated in the mobile station apparatus 200 in the demultiplexer 105. When the interfering power level is extracted, the determining section 106 calculates the total interfering power level, and determines a modulation level number to use in data transmission from the total interfering power level (step S1). The determined modulation level number is notified to the modulation scheme determining section 107.

For the determination of the modulation level number, for example, three, low, middle and high, thresholds (T1, T2 and T3) are beforehand set, and the modulation level number is set at modulation rank "1" with the highest modulation level (herein, corresponding to 64QAM) when the total interfering power level is smaller than the threshold T1, set at modulation rank "2" with the second highest modulation level (herein, corresponding to 16QAM) when the total interfering power level is larger than the threshold T1 but smaller than the threshold T2, set at modulation rank "3" with the third highest modulation level (herein, corresponding to QPSK) when the total interfering power level is larger than the threshold T2 but smaller than the threshold T3, and set at modulation rank "4" with the lowest modulation level (herein, corresponding to BPSK) when the total interfering power level is larger than the threshold T3. In addition, the determination of the modulation level number is not limited thereto, and any other methods may be used for the determination. It is herein assumed that in step T1, modulation rank "1" is determined as a modulation level number corresponding to the total interfering power level, and notified to the modulation scheme determining section 107.

Next, the base station apparatus 100 determines modulation schemes and transmit power of subcarriers sequentially in ascending order of the interfering power level of the subcarrier (step S2). Herein, since modulation rank "1" is notified from the determining section 106 as the determined modulation level number, determined is the transmit power of subcarriers capable of being modulated with 64QAM corresponding to the modulation rank. When modulation rank "2" is notified as the determined modulation level number, determined are modulation schemes and transmit power of subcarriers capable of being modulated with 64QAM or 16QAM respectively corresponding to modulation ranks "1" and "2". In step T2, in determining the modulation schemes and the like for subcarries in ascending order of the interfering power level, it is determined whether the modulation scheme determining section 107 determines the modulation schemes and the like of subcarriers capable of being modulated with the modulation scheme (64QAM) corresponding to notified modulation rank "1" (step T3).

When the modulation schemes and the like are determined for subcarriers capable of being modulated with the modulation scheme corresponding to the notified modulation rank, the base station apparatus 100 sets remaining subcarriers for which modulation schemes and the like are not determined for carrier holes (step T4). Thus, the modulation level number is determined corresponding to the total interfering power level, and data transmission is performed using the subcarriers capable of being modulated with the modulation scheme corresponding to the determined modulation level number. In addition, when the modulation schemes and the like are not determined for subcarriers capable of being modulated with the modulation scheme corresponding to the notified modulation rank, the processing of steps T2 and T3 is repeated.

Referring to FIGS. 11 to 14, described below is the relationship between the interfering power and the transmission spectrum when the modulation schemes and the like are determined using the above-mentioned determination method to perform data transmission. Herein, for convenience in descriptions, the explanation is assumed to be made on the case that each base station apparatus 100 transmits data to the terminal A, terminal B or terminal C as shown in FIG. 16 according to the frame structure as shown in FIG. 17. Each of FIGS. 11 to 14 shows the relationship between the interfering power in each terminal at time t0 to t3 as shown in FIG. 17 and the transmission spectrum to each terminal. In each of FIGS. 11 to 14, (*a*), (*b*) and (*c*) show the relationship between the interfering power estimated by the terminal A, B or C and the transmission spectrum corresponding to the interfering power, respectively.

Figure 11:
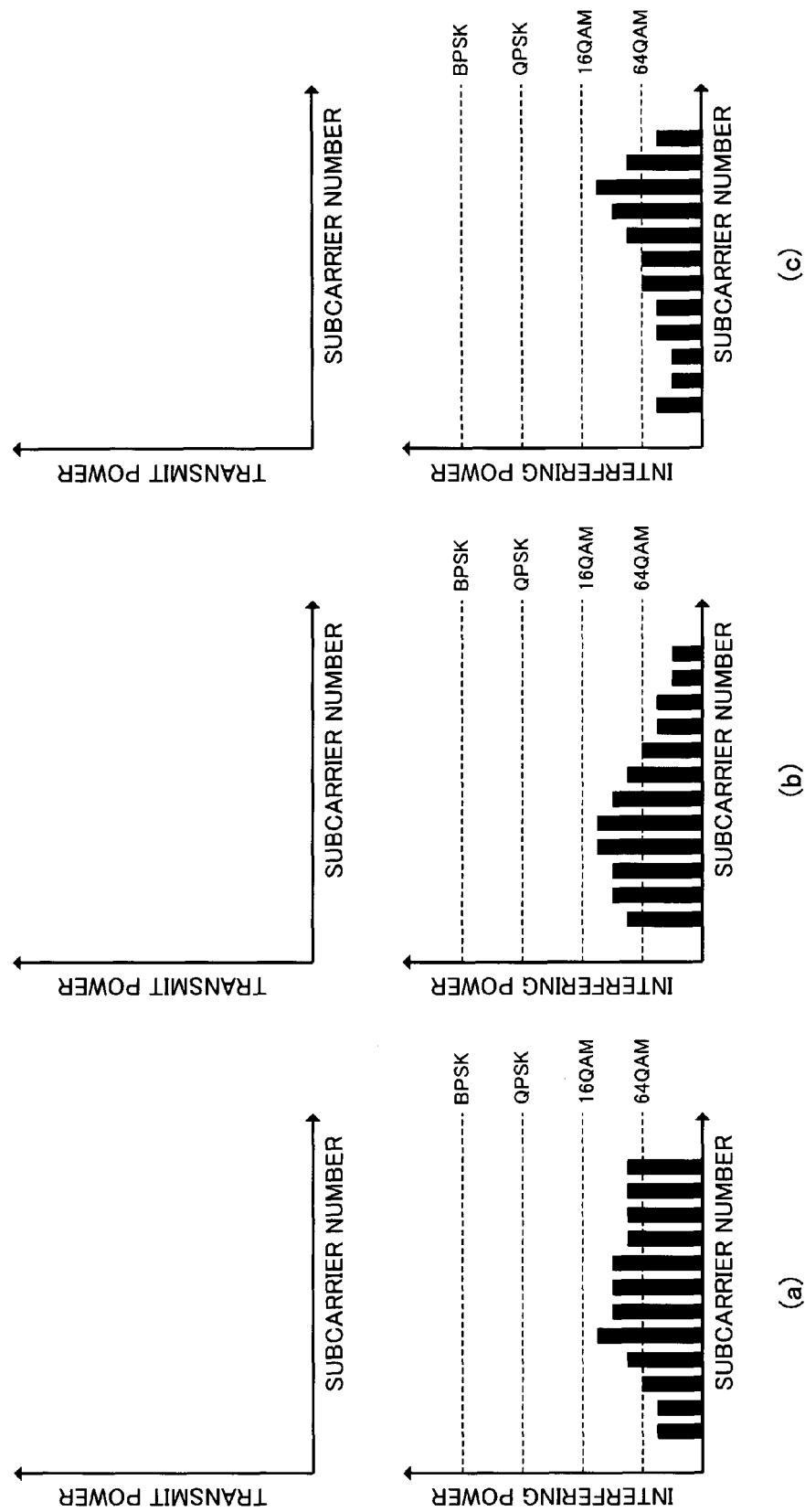
FIG. 11 contains graphs illustrating the relationship between the interfering power and the transmission spectrum when the modulation schemes and the like are determined according to the method as shown in FIG. 10 and data transmission is performed in the base station apparatus according to the second embodiment.

At time t0, as shown in FIG. 11, since any terminals do not start communication, any base station apparatuses 100 do not provide transmit power. Therefore, the transmission spectrum does not appear to any terminals.

Figure 12:
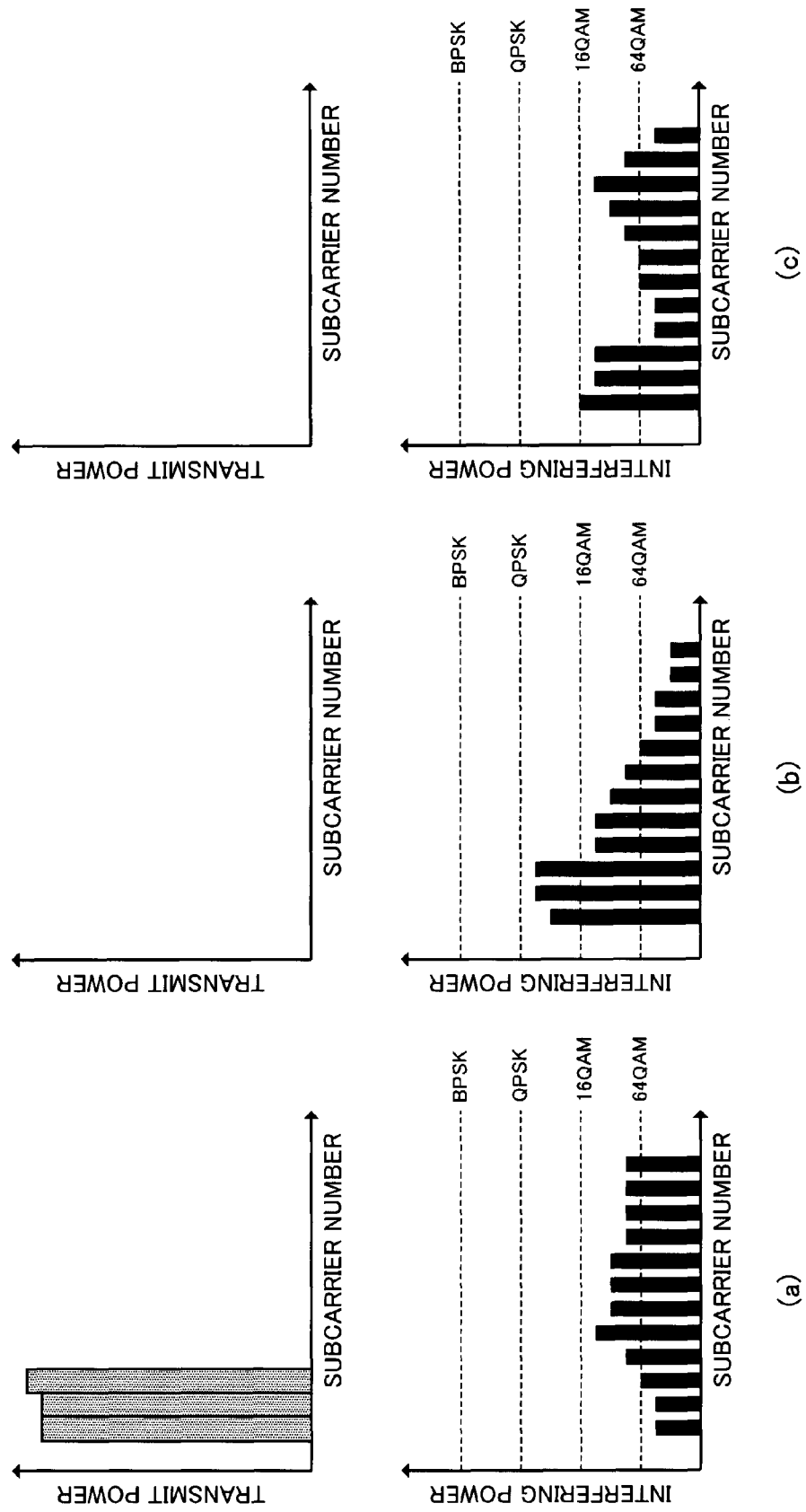
FIG. 12 contains graphs illustrating the relationship between the interfering power and the transmission spectrum when the modulation schemes and the like are determined according to the method as shown in FIG. 10 and data transmission is performed in the base station apparatus according to the second embodiment.

At time t1, as shown in FIG. 12, the terminal A starts communication. With the start of communication in the terminal A, the base station apparatus 100 determines the modulation scheme and the like corresponding to the interfering power notified from the terminal A, and starts data transmission. At this point, the base station apparatus 100 determines a modulation level number corresponding to the total interfering power level notified from the terminal A. Herein, the case is shown that since the total interfering power level is smaller than the above-mentioned threshold T1, modulation rank "1" is determined as the modulation level number. In addition, it is assumed that modulation rank "1" is determined as the modulation level number also in terminals B and C. Herein, as shown in FIG. 12(*a*), the case is shown that since only subcarrier numbers 1 to 3 allow modulation by 64QAM, these three subcarriers are used, and the other subcarrier numbers, 4 to 12, are set for carrier holes. In addition, with the start of communication in the terminal A, the interfering power levels estimated by the terminals B and C increase as shown in FIGS. 12(*b*) and 12(*c*), respectively.

Figure 13:
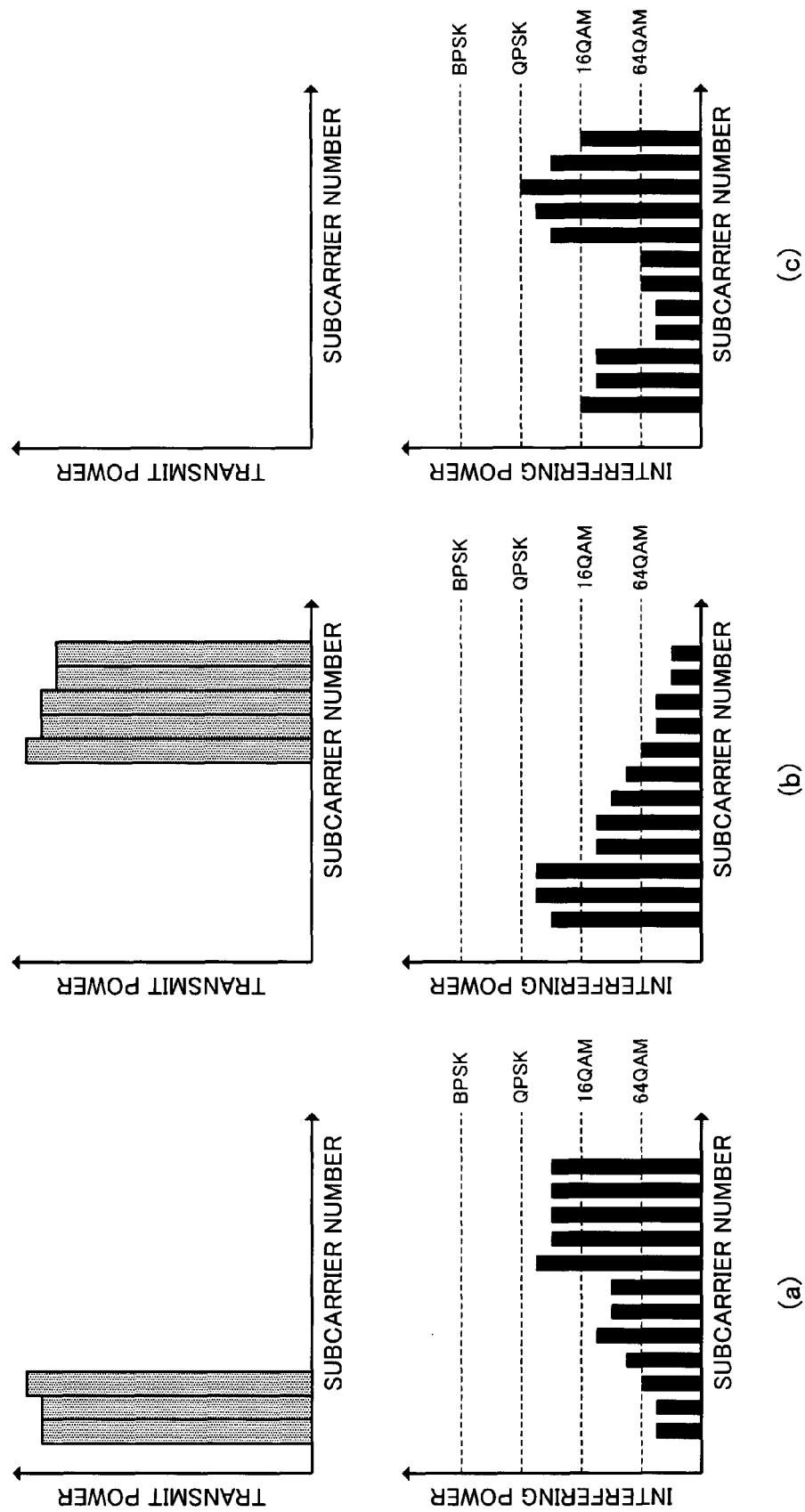
FIG. 13 contains graphs illustrating the relationship between the interfering power and the transmission spectrum when the modulation schemes and the like are determined according to the method as shown in FIG. 10 and data transmission is performed in the base station apparatus according to the second embodiment.

At time t2, as shown in FIG. 13, the terminal B starts communication. With the start of communication in the terminal B, the base station apparatus 100 determines the modulation scheme and the like corresponding to the interfering power notified from the terminal B, and starts data transmission. At this point, the base station apparatus 100 determines a modulation level number corresponding to the total interfering power level notified from the terminal B. Herein, as shown in FIG. 13(*b*), the case is shown that since only subcarrier numbers 8 to 12 allow modulation by 64QAM, these five subcarriers are used, and the other subcarrier numbers, 1 to 7, are set for carrier holes. In addition, with the start of communication in the terminal B, the interfering power levels estimated by the terminals A and C increase as shown in FIGS. 13(*a*) and 13(*c*), respectively.

Figure 14:
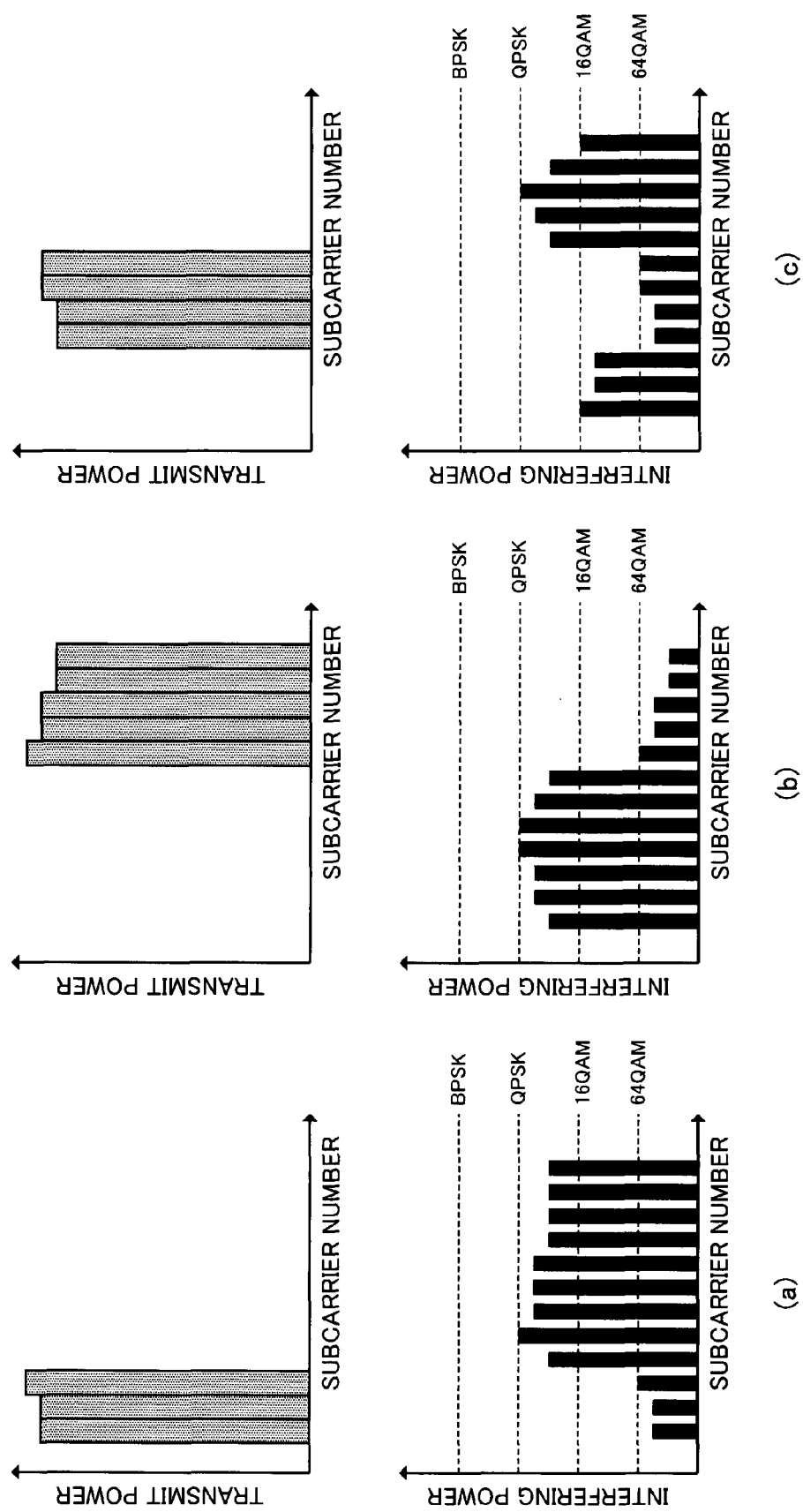
FIG. 14 contains graphs illustrating the relationship between the interfering power and the transmission spectrum when the modulation schemes and the like are determined according to the method as shown in FIG. 10 and data transmission is performed in the base station apparatus according to the second embodiment.
Figure 15:
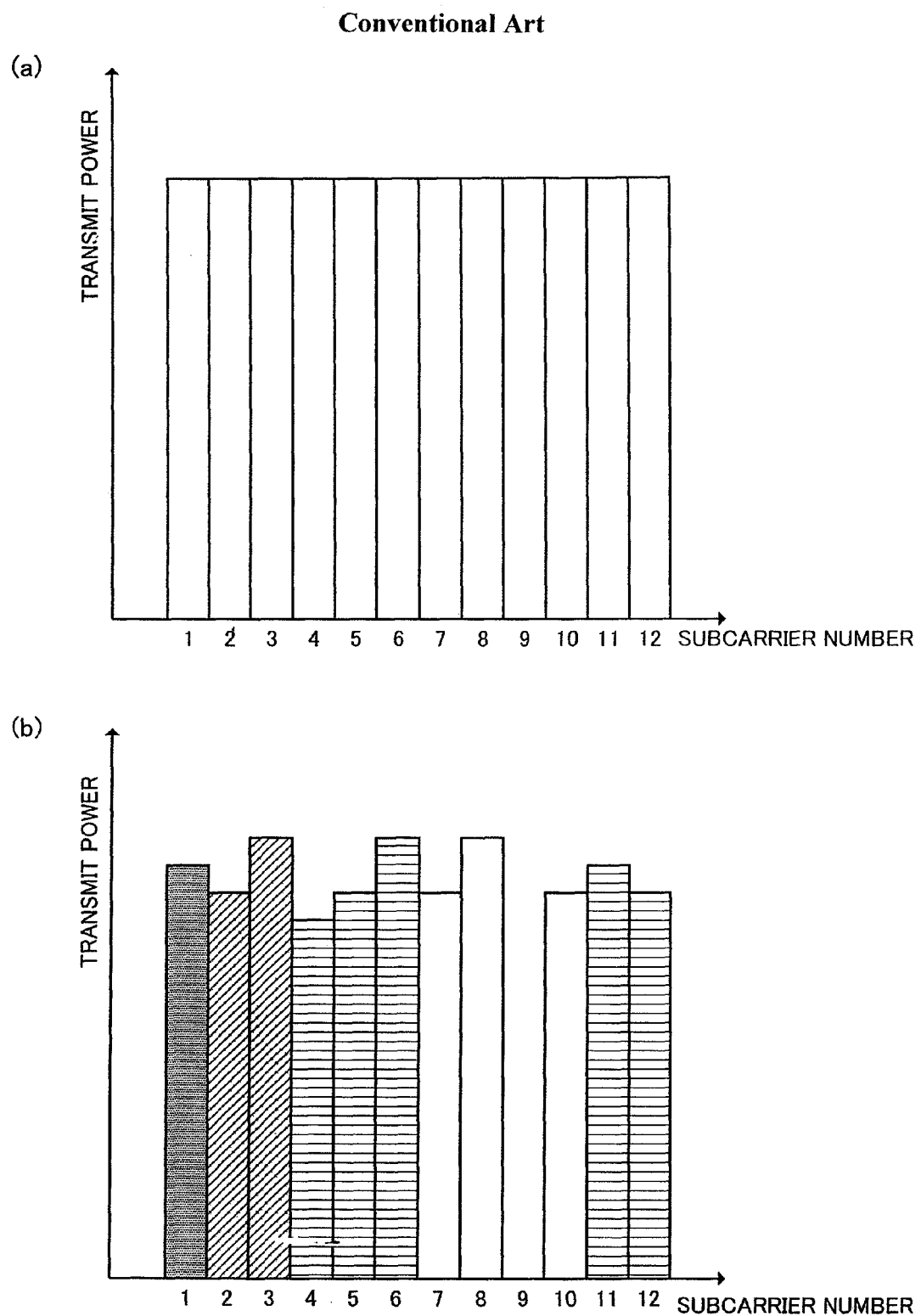
FIG. 15 contains graphs to explain differences in transmission spectrum between a typical OFDM system and an OFDM system applying MTPC.

At time t3, as shown in FIG. 14, the terminal C starts communication. With the start of communication in the terminal C, the base station apparatus 100 determines the modulation scheme and the like corresponding to the interfering power notified from the terminal C, and starts data transmission. At this point, the base station apparatus 100 determines a modulation level number corresponding to the total interfering power level notified from the terminal C. Herein, as shown in FIG. 14(*c*), the case is shown that since only subcarrier numbers 4 to 7 allow modulation by 64QAM, these four subcarriers are used, and the other subcarrier numbers, 1 to 3 and 8 to 12, are set for carrier holes. In addition, with the start of communication in the terminal C, the interfering power levels estimated by the terminals A and B increase as shown in FIGS. 14(*a*) and 14(*b*), respectively.

As shown in FIG. 14, even when the terminals A, B and C start communication, the interfering power levels corresponding to subcarriers used in data transmission to each of the terminals do not change largely from the start of communication in each of the terminals. Accordingly, when the update control timing for the terminal A or B comes respectively at time t4 or t5 as shown in FIG. 17, the subcarriers to use do not change. Therefore, except the case that a specific event occurs, the transmission spectra as shown in FIG. 14 are maintained at time t5.

At time t5, as shown in FIG. 14, data transmission is performed with subcarriers used by the mobile station apparatus 200 of each cell segregated on the frequency axis. As a result, at time t5, while the numbers of bits per OFDM symbol that can be transmitted to the terminals A, B and C are respectively "13", "18" and "10" (total 41 bits) in the case of determination by the known method as shown in FIG. 24, such numbers are "18", "30" and "24" (total 72 bits) according to the determination method of the wireless communication system in the second embodiment, and it is understood that the total throughput increases in the wireless communication system.

Thus, according to the wireless communication system according to the second embodiment, prepared is a plurality of modulation schemes ranked corresponding to the modulation level, subcarriers are used that can be modulated with the modulation scheme corresponding to the modulation level number used in data transmission from a base station apparatus to a mobile station apparatus based on the total sum of interfering power levels of all the subcarriers notified from the mobile station apparatus 200 in the cell, while the other subcarrier(s) is set for a carrier hole(s), and data transmission is thus performed. It is thereby possible to reduce the interference mutually provided among peripheral cells, and to perform data transmission while maintaining the total throughput at the maximum level.

EXPLANATIONS OF LETTERS OR NUMERALS

100 Base station apparatus
101 Reception section
102 Reception antenna
103 Frequency conversion section
104 Demodulation section
105 Demultiplexer
106 Determining section
107 Modulation scheme determining section
108 Subcarrier (SC) assignment section
109 Primary modulation section
110 OFDM modulation section
111 Frequency conversion section
112 Transmission section
113 Transmission antenna
200 Mobile station apparatus
201 Reception section
202 Reception antenna
203 Frequency conversion section
204 OFDM demodulation section
205 Primary demodulation section
206 Interfering power measuring section
207 Multiplexer
208 Modulation section
209 Frequency conversion section
210 Transmission section
211 Transmission antenna

The invention claimed is:

1. A base station apparatus comprising:
an acquiring section that acquires information of interfering power level that a mobile station apparatus receives from peripheral cells from a signal received from the mobile station apparatus;
a determining section that determines the number of subcarriers to use in data transmission corresponding to the information of interfering power level; and
a modulation scheme determining section that determines a modulation scheme for each of the subcarriers to use in data transmission corresponding to the information of interfering power level,
wherein a radio signal is transmitted to the mobile station apparatus using the modulation scheme determined in the modulation scheme determining section and the number of subcarriers determined in the determining section, and
wherein the determining section determines the number of subcarriers to use in data transmission corresponding to a total sum of interfering power levels of all the subcarriers contained in the information of interfering power level.

2. The base station apparatus according to claim 1, wherein the modulation scheme determining section sets a carrier hole on a subcarrier except subcarriers contained in the number of subcarriers to use in data transmission determined in the determining section.

3. The base station apparatus according to claim 1, wherein the determining section determines the number of subcarriers to use in data transmission by comparing the total sum of interfering power levels of all the subcarriers with a predetermined threshold.

4. The base station apparatus according to claim 1, wherein the determining section determines subcarriers contained in the number of subcarriers to use in data transmission in ascending order of interfering power level of subcarriers based on the information of interfering power level.

5. A base station apparatus comprising:
an acquiring section that acquires information of interfering power level that a mobile station apparatus receives from peripheral cells from a signal received from the mobile station apparatus;
a modulation scheme determining section that determines a modulation scheme for each subcarrier to use in data transmission corresponding to the information of interfering power level; and
a determining section that determines a predetermined modulation level number to designate a rank of each of a plurality of modulation schemes ranked corresponding to the modulation level, corresponding to the information of interfering power level, and the number of subcarriers capable of being modulated with the modulation scheme corresponding to the modulation level number,
wherein a radio signal is transmitted to the mobile station apparatus using the modulation scheme determined in the modulation scheme determining section and the number of subcarriers determined in the determining section, and
wherein the determining section determines the modulation level number corresponding to a total sum of interfering power levels of all the subcarriers contained in the information of interfering power level.

6. The base station apparatus according to claim 5, wherein the modulation scheme determining section sets a carrier hole on a subcarrier except subcarriers capable of being modulated with the modulation scheme corresponding to the modulation level number determined in the determining section.

7. The base station apparatus according to claim 5, wherein the determining section determines the modulation level number by comparing the total sum of interfering power levels of all the subcarriers with a predetermined threshold.

* * * * *